(12) United States Patent
Mitsuda et al.

(10) Patent No.: US 11,894,725 B2
(45) Date of Patent: Feb. 6, 2024

(54) ROTATING ELECTRIC MACHINE

(71) Applicant: Mitsubishi Electric Corporation, Tokyo (JP)

(72) Inventors: Hiroshi Mitsuda, Tokyo (JP); Yoshihiro Miyama, Tokyo (JP); Moriyuki Hazeyama, Tokyo (JP); Masaya Inoue, Tokyo (JP); Masashi Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 574 days.

(21) Appl. No.: 17/253,624

(22) PCT Filed: Apr. 12, 2019

(86) PCT No.: PCT/JP2019/015967
§ 371 (c)(1),
(2) Date: Dec. 18, 2020

(87) PCT Pub. No.: WO2020/021788
PCT Pub. Date: Jan. 30, 2020

(65) Prior Publication Data
US 2021/0265882 A1   Aug. 26, 2021

(30) Foreign Application Priority Data
Jul. 25, 2018   (JP) ................... 2018-138934

(51) Int. Cl.
*H02K 1/276* (2022.01)
*H02K 21/14* (2006.01)
*H02K 29/03* (2006.01)

(52) U.S. Cl.
CPC ........... *H02K 1/2766* (2013.01); *H02K 21/14* (2013.01); *H02K 29/03* (2013.01)

(58) Field of Classification Search
CPC ...... H02K 1/2766; H02K 1/276; H02K 21/14; H02K 29/03; H02K 16/02
See application file for complete search history.

(56) References Cited

U.S. PATENT DOCUMENTS 5,903,080 A * 5/1999 Nashiki .................. H02K 29/03
310/168
2005/0269888 A1   12/2005 Utaka
(Continued)

FOREIGN PATENT DOCUMENTS

JP   2003-204640 A   7/2003
JP   2003-333778 A   11/2003
(Continued)

OTHER PUBLICATIONS

International Search Report and Written Opinion dated Jun. 25, 2019, received for PCT Application No. PCT/JP2019/015967, Filed on Apr. 12, 2019, 11 Pages including English Translation.

*Primary Examiner* — Tulsidas C Patel
*Assistant Examiner* — Joshua Kiel M Rodriguez
(74) *Attorney, Agent, or Firm* — XSENSUS LLP

(57) ABSTRACT

Provided is a rotating electric machine (100) including a stator (1) and a rotor (2). The rotor (2) includes a plurality of stages of rotor units (201 and 202) stacked in an axial direction. Each of the rotor units (201 and 202) includes a pair of permanent magnets (21) and slits (22a and 22b) arranged in one or more rows. The slits (22a and 22b) has an arc-like shape. Both ends of the arc-like shape are located on an outer periphery side of the rotor (2). When an angle formed between two straight lines that connect positions of both ends of the arc-like shape and a rotation axis center of the rotor (2) is defined as an arc angle, at least one of the arc angle of the slit (22a) and the number of rows of the slits is different between at least two rotor units (201 and 202).

13 Claims, 25 Drawing Sheets

(56) References Cited

U.S. PATENT DOCUMENTS

2007/0210664 A1  9/2007  Matsunobu et al.
2018/0083502 A1  3/2018  Ishikawa

FOREIGN PATENT DOCUMENTS

| JP | 2005-341655 A | 12/2005 |
| JP | 2009-219291 A | 9/2009 |
| JP | 2013-255321 A | 12/2013 |
| JP | 2016-82778 A | 5/2016 |
| JP | 2016-220382 A | 12/2016 |
| WO | 2017/009969 A1 | 1/2017 |

\* cited by examiner

ROTATING ELECTRIC MACHINE

CROSS-REFERENCE TO RELATED APPLICATIONS

The present application is based on PCT filing PCT/JP2019/015967, filed Apr. 12, 2019, which claims priority to JP 2018-138934, filed Jul. 25, 2018, the entire contents of each are incorporated herein by reference.

TECHNICAL FIELD

The present invention relates to a rotating electric machine including a rotor and a stator.

BACKGROUND ART

In a rotating electric machine, as a technique for reducing a torque ripple, there has been generally adopted a technology of allowing a magnetic center angle of a rotor to skew by one slot angle of a stator in a rotating direction of the rotor.

When the magnetic center angle of the rotor is allowed to skew, however, a difference in magnetic resistance at a rotational position is reduced. Thus, there arises a problem in that output torque is reduced.

Further, as another technique for reducing the torque ripple, there has been proposed a technique of gradually changing an area of a non-magnetic region of the rotor in a laminating direction to moderate a change in magnet magnetic flux interlinked with the stator. With the technique described above, torque fluctuation can be suppressed. Thus, the torque ripple can be reduced (see, for example, Patent Literature 1).

CITATION LIST

Patent Literature

[PTL 1] JP 2009-219291 A

SUMMARY OF INVENTION

Technical Problem

As described above, with a rotating electric machine described in Patent Literature 1, the torque ripple caused by the magnet magnetic flux can be reduced. However, there arises a problem in that reduction in magnet magnetic flux may result in reduction in output torque.

The present invention has been made to solve the problems described above, and has an object to provide a rotating electric machine in which a torque ripple is reduced and reduction in output torque is suppressed.

Solution to Problem

According to the present invention, there is provided a rotating electric machine including: a stator having an annular shape; and a rotor provided inside the stator, wherein the rotor includes a plurality of stages of rotor units stacked in an axial direction of the rotor, wherein each of the plurality of stages of rotor units includes a pair of permanent magnets and a slit arranged in one or more rows in a radial direction of the rotor between the pair of permanent magnets, wherein the slit has an arc-like shape that projects inward in a radial direction of the rotor and extends in a circumferential direction of the rotor, and wherein, when an angle formed between two straight lines that connect positions of both ends of the arc-like shape and a rotation axis center of the rotor is defined as an arc angle of the slit, at least one of the arc angle of the slit and the number of rows of the slits is different between at least two of the rotor units.

Advantageous Effects of Invention

According to the present invention, it is possible to provide a rotating electric machine in which a torque ripple is reduced and reduction in output torque is suppressed.

DESCRIPTION OF EMBODIMENTS

Now, embodiments of a rotating electric machine according to the present invention are described with reference to the drawings.

First Embodiment

Figure 1:
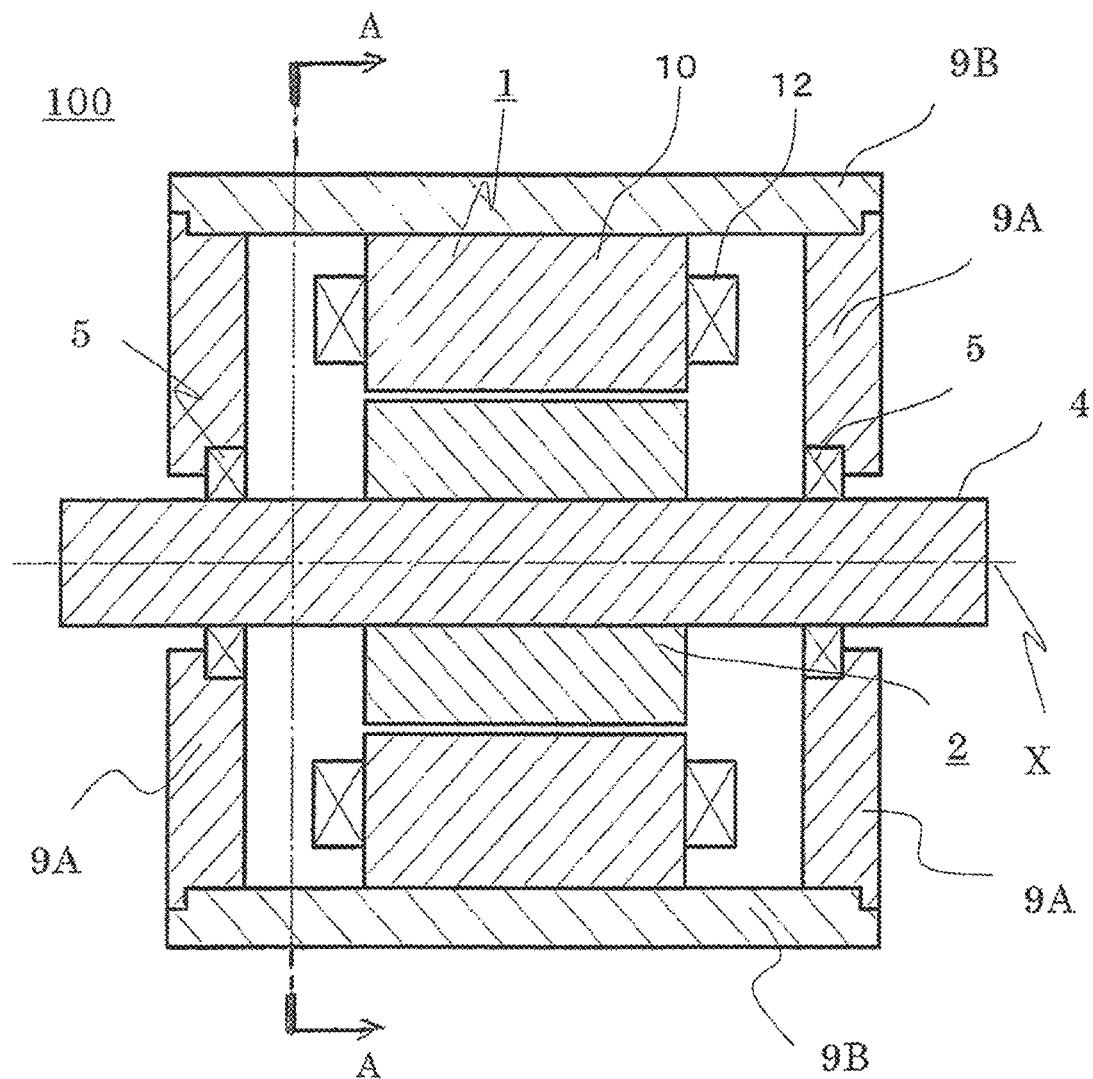
FIG. 1 is a sectional view for illustrating an overall configuration of a rotating electric machine according to a first embodiment of the present invention.
Figure 2:
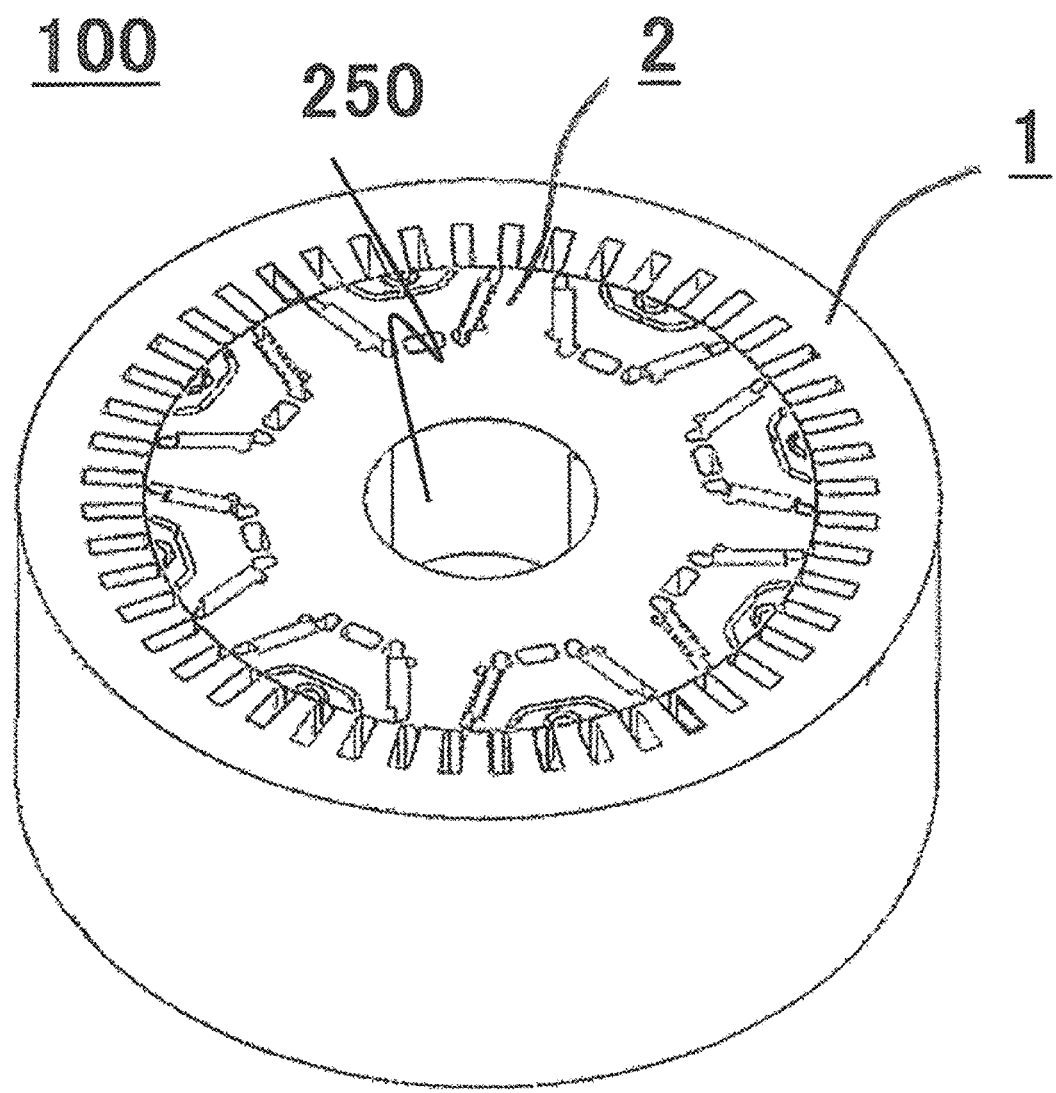
FIG. 2 is a perspective view for illustrating a configuration of the rotating electric machine according to the first embodiment of the present invention.
Figure 3:
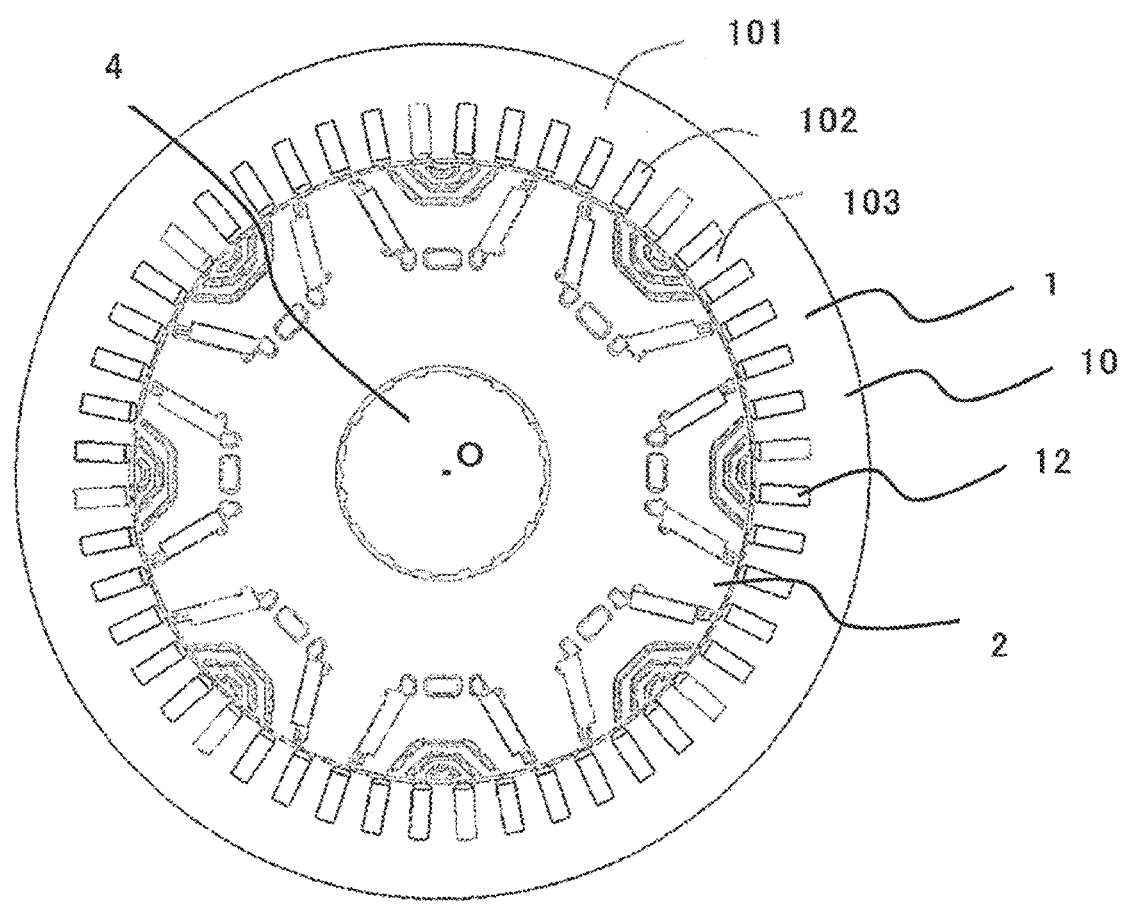
FIG. 3 is a sectional view taken along the line A-A of FIG. 1.

FIG. 1 is a sectional view for illustrating an overall configuration of a rotating electric machine according to a first embodiment of the present invention. FIG. 2 is a perspective view of the rotating electric machine illustrated in FIG. 1. In FIG. 2, illustration of some components such as housings 9A and 9B and a spindle 4 of FIG. 1 is omitted. FIG. 3 is a sectional view taken along the line A-A of FIG. 1.

In the first embodiment, a rotating electric machine 100 is described by taking an 8-pole 48-slot three-phase distributed-winding permanent magnet rotating electric machine as an example.

As illustrated in FIG. 1 to FIG. 3, the rotating electric machine 100 includes a stator 1 and a rotor 2. The stator 1 has an annular shape. The rotor 2 has a columnar shape and is arranged inside the stator 1. An air gap is formed between an inner peripheral surface of the stator 1 and an outer peripheral surface of the rotor 2. Further, as illustrated in FIG. 2, a spindle insertion hole 250 is formed in a central portion of the rotor 2. The spindle insertion hole 250 is a through hole passing in an axial direction of the rotor 2. The spindle 4 is inserted into the spindle insertion hole 250. The spindle 4 is fixed to the rotor 2.

As illustrated in FIG. 1, two bearings 5 are fitted over outer peripheral surfaces of both ends of the spindle 4 in an axial direction of the spindle 4. When outer peripheral surfaces of the bearings 5 and inner peripheral surfaces of the first housings 9A are fitted together, the bearings 5 are held in the first housings 9A. In this manner, the spindle 4 is supported by the first housings 9A.

As illustrated in FIG. 1, the stator 1 includes a stator core 10 and a stator coil 12. The stator core 10 is formed of an armature core. When an outer peripheral surface of the stator core 10 and an inner peripheral surface of the second housing 9B are fitted together, the stator 1 is fixed to the second housing 9B. The first housing 9A and the second housing 9B form a housing corresponding to a casing of the rotating electric machine 100.

With the configuration described above, the rotor 2 is supported by the spindle 4 so as to be rotatable relative to the stator 1. The rotor 2 is rotated about the spindle 4. In the following description, a center line of the spindle 4, which extends in the axial direction, is referred to as "rotation axis X".

Next, with reference to FIG. 3, a configuration of the stator core 10 of the stator 1 is described. The stator core 10 includes a core back portion 101, forty-eight teeth 103, and forty-eight slots 102. The core back portion 101 has an annular shape. The teeth 103 project from the core back portion 101 toward the rotor 2 side. The slots 102 are formed between the teeth 103. The teeth 103 are arranged along an inner periphery of the stator core 10 so as to be spaced apart from each other in a circumferential direction of the stator core 10. The teeth 103 are arranged, for example, so as to be evenly spaced. The stator core 10 is formed by laminating a plurality of stator core sheets, each having the same shape, in the axial direction for the purpose of reducing an eddy current. Each of the stator core sheets is formed by punching a piece having the same shape out of an electromagnetic steel sheet. A distal end portion of each of the teeth 103 of the stator core 10 is opposed to the outer peripheral surface of the rotor 2 through the air gap therebetween. The stator coil 12 includes forty-eight windings. The forty-eight windings are accommodated in the slots 102, respectively. The windings are wound around the stator core 10 in a distributed winding pattern. In the distributed winding pattern, the windings are wound so as to be distributed over a plurality of teeth 103. The stator coil 12 includes sixteen windings for one phase. Thus, the stator coil 12 includes a total of forty-eight windings for three phases. The forty-eight windings are connected to each other. The windings are connected to an inverter being a power converter (not shown). When a three-phase AC current is caused to flow from the inverter to the stator core 12, a rotating magnetic field is generated from the stator 1 in the air gap. As a result, torque is generated in the rotor 2.

Figure 4:
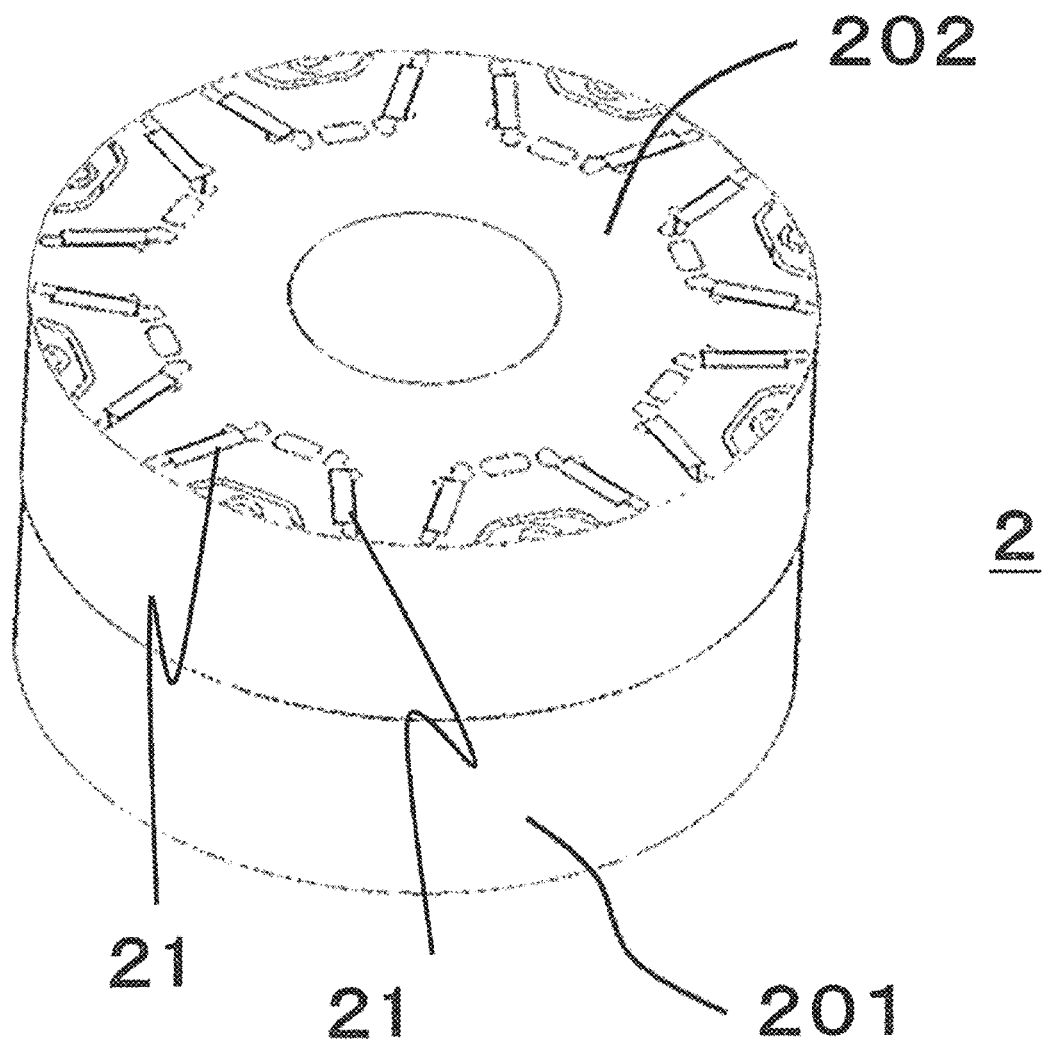
FIG. 4 is a perspective view for illustrating a configuration of a rotor of the rotating electric machine according to the first embodiment of the present invention.

FIG. 4 is an overall view of the rotor 2 according to the first embodiment. As illustrated in FIG. 4, the rotor 2 includes a first rotor unit 201 and a second rotor unit 202. The second rotor unit 202 is stacked on the first rotor unit 201. The first rotor unit 201 and the second rotor unit 202 have the same outside dimensions.

Figure 5:
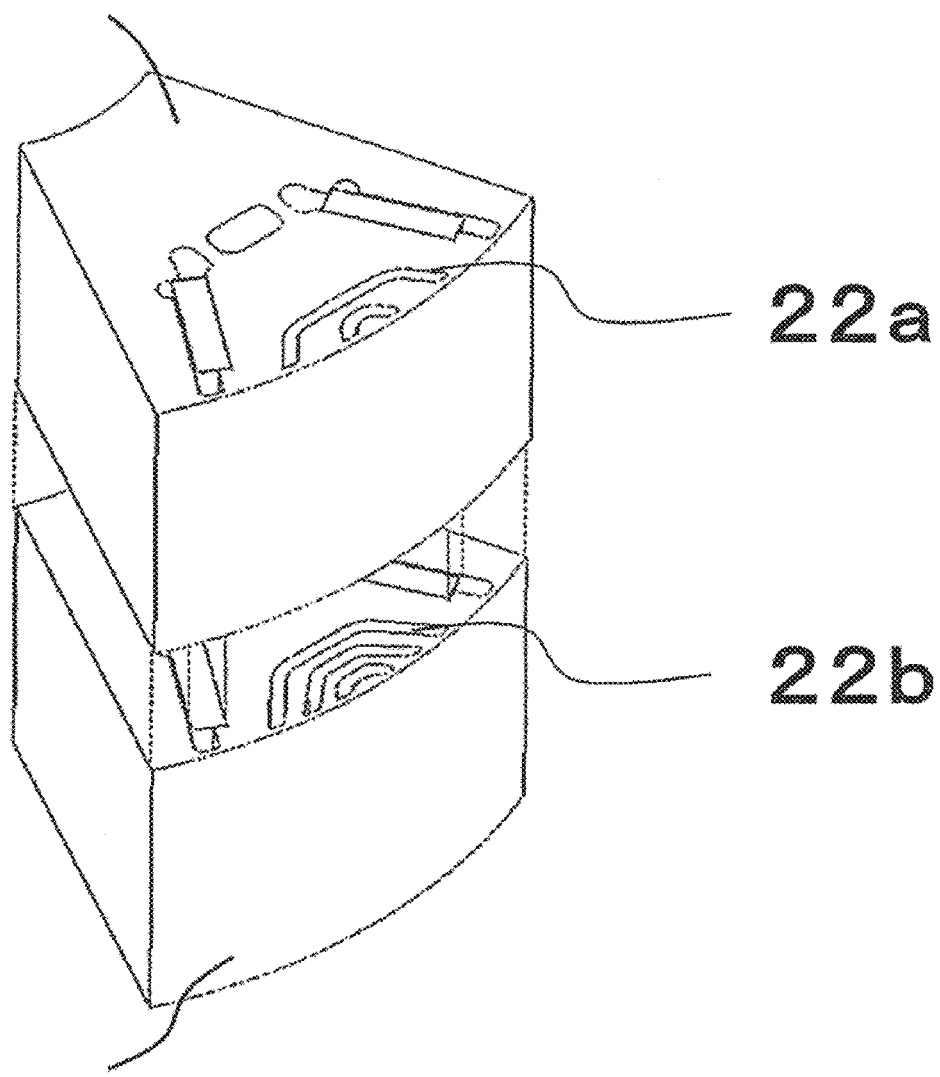
FIG. 5 is an exploded perspective view for illustrating the configuration of the rotor of the rotating electric machine according to the first embodiment of the present invention for one pole.

As described later, the rotor 2 includes eight pairs of permanent magnets 21. The eight pairs of permanent magnets form magnetic poles, respectively. Thus, the rotor 2 has eight magnetic poles. Central angles of the eight magnetic poles of the rotor 2 are equal to each other. Thus, in the first embodiment, each of the central angles of the eight magnetic poles is 45 degrees. FIG. 5 is an exploded perspective view for illustrating one magnetic pole portion of the eight magnetic poles of the rotor 2 according to the first embodiment. As illustrated in FIG. 5, a portion of the first rotor unit 201 and a portion of the second rotor unit 202, which form one magnetic pole, basically have the same configuration, but are different in configurations of slits 22a and slits 22b described later. In the following description, as represented by "22a" and "22b", components of the first rotor unit 201 and the second rotor unit 202, which correspond to each other, are denoted by the same numeral followed by corresponding lowercase alphabetic letters, respectively.

Figure 6:
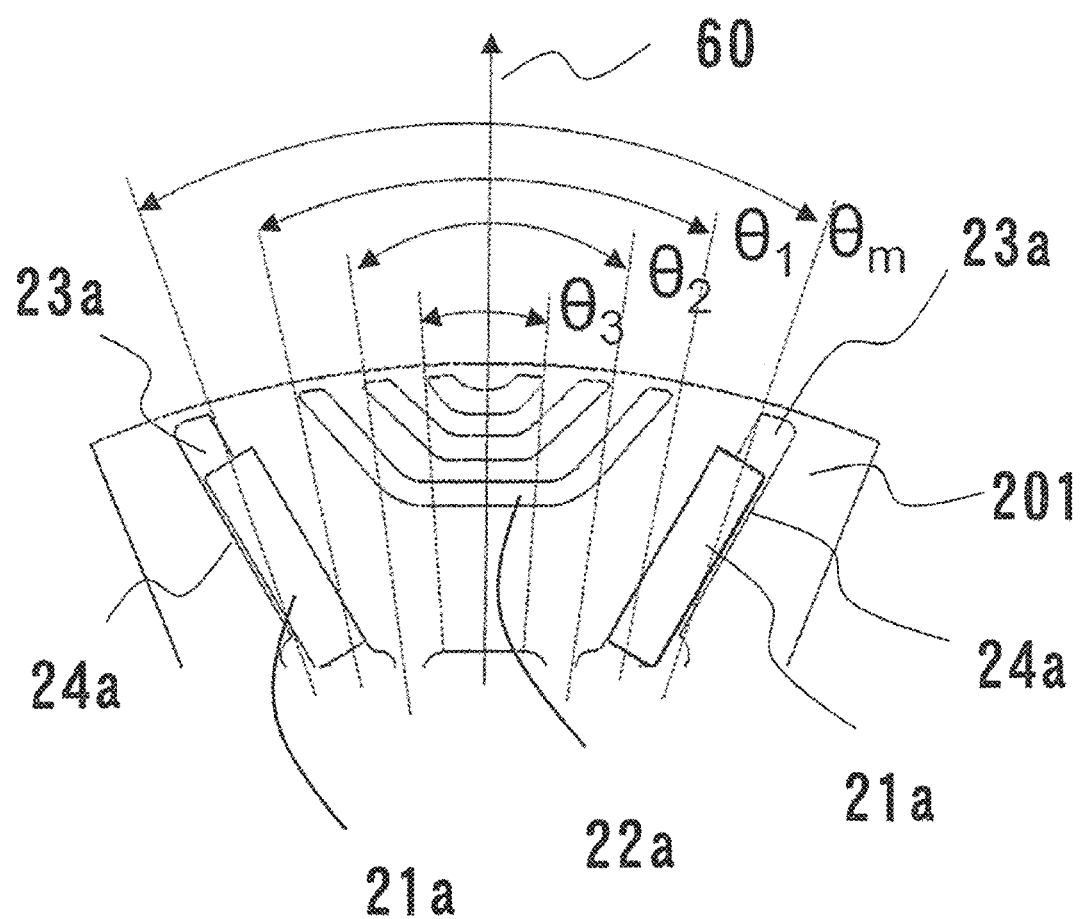
FIG. 6 is a partial sectional view of a first rotor unit illustrated in FIG. 5.

FIG. 6 is a view for illustrating a sectional shape of the first rotor unit 201 illustrated in FIG. 5. Thus, FIG. 6 is an illustration of one magnetic pole portion of the eight magnetic poles of the rotor 2. FIG. 6 is an illustration of a cross section taken along a plane perpendicular to an axial direction of the first rotor unit 201. The eight magnetic poles of the rotor 2 have the same configuration. Thus, a configuration of only one magnetic pole portion is described below. As illustrated in FIG. 6, the first rotor unit 201 includes a pair of permanent magnets 21a, the slits 22a formed between the pair of permanent magnets 21a, and a pair of flux barriers 23a for each magnetic pole.

The pair of permanent magnets 21a are inserted into magnet insertion holes 24a and are fixed therein. In this case, a center line of the magnetic pole formed by the pair of permanent magnets 21a is referred to as "d axis 60". The pair of permanent magnets 21a are arranged in a V-like pattern so as to be line-symmetric with respect to the d axis 60. More specifically, a distance between the pair of permanent magnets 21a gradually increases from a center of the rotor 2 toward an outer periphery thereof. However, the pair of permanent magnets 21a are apart from each other, and are not in contact with each other. Further, the slits 22a arranged in three rows, each extending in a circumferential direction of the rotor 2, are formed between the pair of permanent magnets 21a. Each of the slits 22a has an arc-like shape that is curved toward an inner side. An opening of each of the slits 22a, which has the arc-like shape, is opposed to the inner peripheral surface of the stator 1. The slits 22a in three rows are arranged in a concentric pattern. Each of the slits 22a is formed so as to have a line-symmetric shape with respect to the d axis 60. Further, each of the slits 22a projects toward a radially inner side. Specifically, each of the slits 22a is arranged so that both end portions of the arc-like shape are located on an outer periphery side of the rotor 2 and a central portion of the arc-like shape is located closer to the center of the rotor 2 than both end portions. Further, among the slits 22a arranged in three rows, the slit 22a arranged closest to the outer periphery side of the rotor 2 has the shortest length in the circumferential direction, and the slit 22a arranged closest to the center of the rotor 2 has the longest length in the circumferential direction. The slits 22a arranged in three rows have the same width. The pair of flux barriers 23a are formed in an outer peripheral portion of the rotor 2. The flux barriers 23a are formed in connection with the magnet insertion holes 24a for the permanent magnets 21a, respectively.

In this case, an intersection between the cross section of the rotor 2 illustrated in FIG. 3 and the rotation axis X is referred to as "rotation axis center O". Although the rotation axis center O is not illustrated in FIG. 6, an angle formed between two straight lines that connect outermost positions on both end portions of each of the slits 22a and the rotation axis center O is defined as "arc angle". In this case, as illustrated in FIG. 6, the slits 22a are arranged so that the slits 22a in three rows have arc angles θ1, θ2, and θ3, respectively. Further, an angle formed between straight lines that connect innermost positions on both end portions of the flux barriers 23a on the outer periphery side and the rotation axis center O is defined as "angle formed between the pair of flux barriers". In this case, as illustrated in FIG. 6, the pair of flux barriers 23a are formed so that the angle formed between the pair of flux barriers 23a becomes θm.

Figure 7:
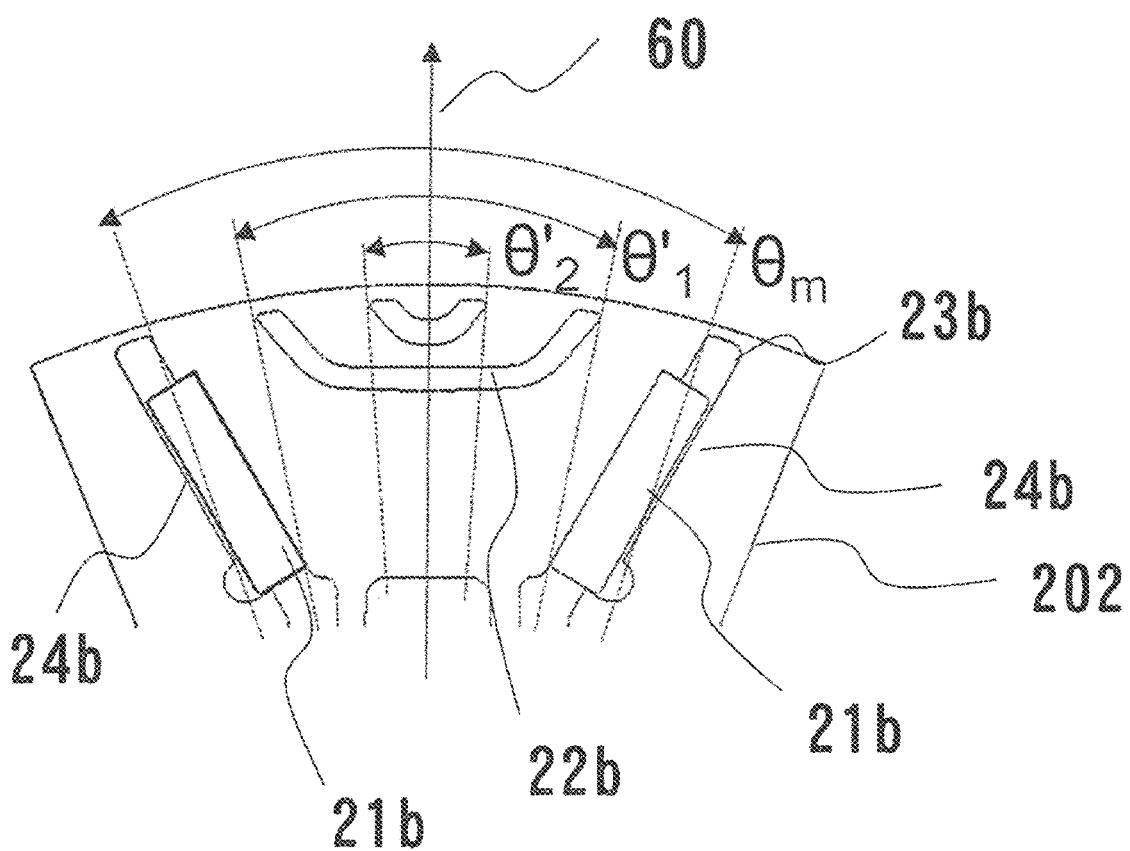
FIG. 7 is a partial sectional view of a second rotor unit illustrated in FIG. 5.

FIG. 7 is a view for illustrating a sectional shape of the second rotor unit 202 illustrated in FIG. 5. Thus, FIG. 7 is an illustration of one magnetic pole portion of the eight magnetic poles of the rotor 2. FIG. 7 is an illustration of a cross section taken along a plane perpendicular to an axial direction of the second rotor unit 202. As illustrated in FIG. 7, the rotor unit 202 includes a pair of permanent magnets 21b, the slits 22b formed between the pair of permanent magnets 21b, and flux barriers 23b.

The pair of permanent magnets 21b are inserted into magnet insertion holes 24b and are fixed therein. In this case, a center line of the magnetic pole formed by the pair of permanent magnets 21b is referred to as "d axis 60". The pair of permanent magnets 21b are arranged in a V-like pattern so as to be line-symmetric with respect to the d axis 60. More specifically, a distance between the pair of permanent magnets 21b gradually increases from a center of the rotor 2 toward an outer periphery thereof. However, the pair of permanent magnets 21b are apart from each other, and are not in contact with each other. Further, the slits 22b arranged in two rows are formed between the pair of permanent magnets 21b. Each of the slits 22b has an arc-like shape that is curved toward an inner side. An opening of each of the slits 22b, which has the arc-like shape, is opposed to the inner peripheral surface of the stator 1. The slits 22b in two rows are arranged in a concentric pattern. Each of the slits 22b is formed so as to have a line-symmetric shape with respect to the d axis 60. Further, each of the slits 22b projects toward a radially inner side. Specifically, each of the slits 22b is arranged so that both end portions of the arc-like shape are located on an outer periphery side of the rotor 2 and a central portion of the arc-like shape is located closer to the center of the rotor 2 than both end portions. Further, each of the slits 22b is arranged so that both end portions of the arc-like shape are located on the outer periphery side of the rotor 2 and the central portion of the arc-like shape is located closer to the center than both end portions. Further, one of the slits 22b arranged in two rows, which is formed at a position closer to the outer periphery side of the rotor 2, has the shorter length in the circumferential direction, and the slit 22b, which is formed at a position closer to the center of the rotor 2, has the longer length in the circumferential direction. The slits 22b arranged in two rows have the same width. Further, the pair of flux barriers 23b are formed in the outer peripheral portion of the rotor 2. Each of the flux barriers 23b is formed in connection with the magnet insertion holes 24b for the permanent magnets 21b, respectively.

In this case, as described above, as illustrated in FIG. 3, the rotation axis center through which the rotation axis X of the rotor 2 passes is referred to as "rotation axis center O". Although the rotation axis center O is not illustrated in FIG. 7, an angle formed between straight lines that connect outermost positions on both end portions of each of the slits 22b and the rotation axis center O is defined as "arc angle". In this case, as illustrated in FIG. 7, the slits 22b are arranged so that the arc angles of the slits 22b in two rows become arc angles θ'1 and θ'2, respectively. Further, the pair of flux barriers 23b are formed so that an angle formed between straight lines that connect innermost positions on both end portions of the flux barriers 23b on the outer periphery side of the rotor 2 and the rotation axis center O becomes θm.

In this case, in FIG. 6 and FIG. 7, the arc angles θ1, θ2, θ3, θ'1, and θ'2 are defined as the angles each being formed between the straight lines that connect the outermost positions on both ends of each of the slits 22a and 22b and the rotation axis center O. However, the arc angles are not limited thereto. The arc angles may be defined as angles, each being formed between straight lines that connect innermost positions on both ends of each of the slits 22a and 22b and the rotation axis center O. Further, similarly, the angles θm are defined as the angles each being formed between the straight lines that connect the innermost positions on both ends of the flux barriers 23a and 23b and the rotation axis center O. However, the angles θm are not limited thereto. The angles θm may be defined as angles, each being formed between the straight lines that connect outermost positions on both ends of the flux barriers 23a and 23b and the rotation axis center O. Further, in the first embodiment, the angles θm are defined with use of the positions of both ends of the flux barriers 23a and 23b. The angles θm are not limited thereto. The angles θm may be defined with use of positions of both ends of the permanent magnets 21a and 21b.

As described above, the arc angles and the number of rows of the slits 22a and those of the slits 22b are different between the first rotor unit 201 and the second rotor unit 202, which are adjacent to each other in the axial direction. As a result, a magnetic path through which magnet magnetic flux of the first rotor unit 201 passes and a magnetic path through which magnet magnetic flux of the second rotor unit 202 passes are different. Thus, in the first embodiment, the magnetic flux of the permanent magnets 21a and the magnetic flux of the permanent magnets 21b are different from each other between the rotor units 201 and 202.

In the first embodiment, both of the arc angles and the number of rows of the slits 22a and those of the slits 22b are different in the first rotor unit 201 and the second rotor unit 202. However, the arc angles and the number of rows are not limited thereto. At least one of the arc angles and the number of rows is required to be different.

Meanwhile, shapes and positions of the magnet insertion holes 24a, into which the pair of permanent magnets 21a are inserted, and shapes and positions of the magnet insertion holes 24b, into which the pair of permanent magnets 21b are inserted, are the same for the first rotor unit 201 and the second rotor unit 202. Further, shapes of the pair of permanent magnets 21a and shapes of the pair of permanent magnets 21b are the same for the first rotor unit 201 and the second rotor unit 202.

Now, effects obtained with the rotating electric machine 100 according to the first embodiment are described. As expressed by Expression (1) given below, an electromagnetic force F is proportional to a square of an air-gap magnetic flux density B. A magnetic flux density can be expressed as a function of a space harmonic order k and a time harmonic order v. In Expression (1), θ represents a position in the circumferential direction, t represents time, and ω represents an angular frequency. Further, A(k, v) represents an amplitude for the space harmonic order and the time harmonic order, and ϕ(k, v) represents a phase for the space harmonic order and the time harmonic order.

[Expression 1]

$$F = \frac{B^2}{2\mu_c} \quad (1)$$

$$B = \sum_k \sum_v A(k, v)\cos\{k\theta - v\omega t + \phi(k, v)\}$$

Further, the air-gap magnetic flux density B is calculated based on a result of multiplication of a permeance of the rotor 2 by a magnetomotive force of the permanent magnets 21a and 21b. The permeance is a degree of a magnetic resistance. An amplitude and a phase of a permeance harmonic component of the rotor 2 change in accordance with the arc angles and the number of the slits 22a and those of the slits 22b and the arc angle and the number of flux barriers 23a and those of the flux barriers 23b. As a result, the amplitude A(k, v) and the phase ϕ(k, v) of the air-gap magnetic flux density change. In this case, the torque ripple is one mode of the electromagnetic force F, which can be expressed with a space order of a 0-th order and a time order of a v-th order. Thus, it can be said that the amplitude and the phase change under an influence of the arc angles and the number of the slits 22a and those of the slits 22b and the arc angle and the number of flux barriers 23a and those of the flux barriers 23b.

Further, in the permanent magnet rotating electric machine, the result of multiplication of the magnetomotive force by the permeance has a great influence on the air-gap magnetic flux density B. Thus, the shapes of the slits 22a and 22b and the flux barriers 23a and 23b are changed so that the magnetic paths through which the magnet magnetic flux passes become different. In this manner, the amplitude and the phase of the torque ripple can be changed. Further, when the slits 22a and 22b are formed as arc-shaped slits, the d axis, along which the magnetic flux is less likely to flow, and a q axis perpendicular to the d axis, along which the magnetic flux is likely to flow, can be formed. As a result, the slits 22a and 22b serve to increase reluctance torque.

Figure 8:
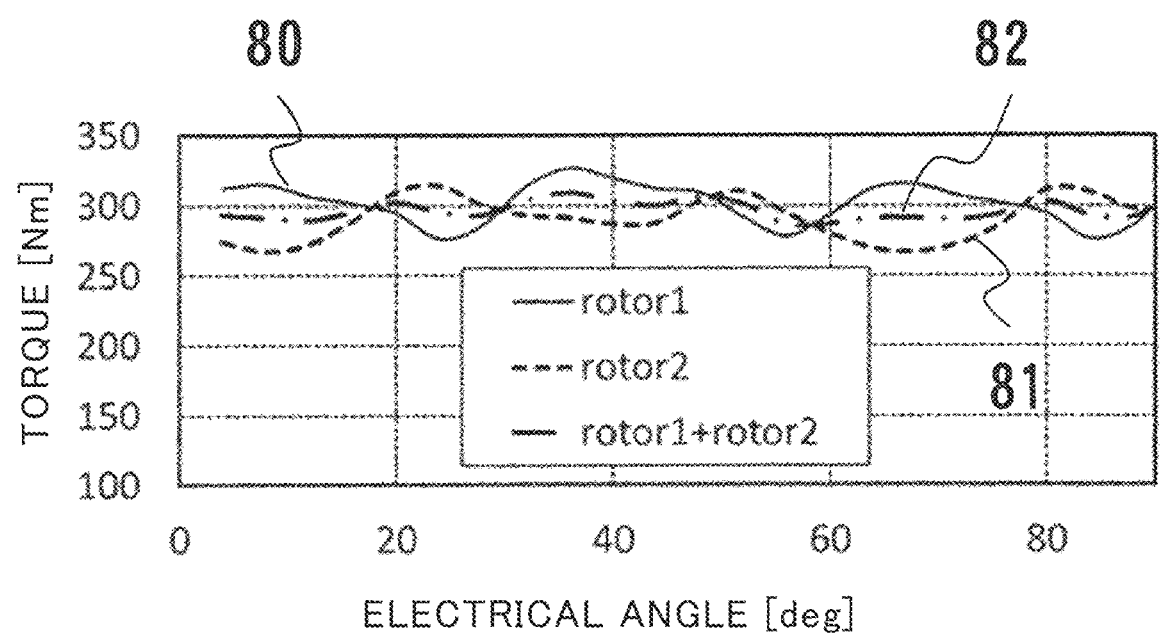
FIG. 8 is a graph for showing an analysis result of examination of torque pulsations in the rotating electric machine according to the first embodiment of the present invention.

FIG. 8 is a graph for showing a change in torque, which is analyzed by a finite element method, for the rotating electric machine 100 according to the first embodiment. The horizontal axis represents an electrical angle, and the vertical axis represents the torque. Further, in FIG. 8, a solid line 80 indicates a torque pulsation that occurs in the first rotor unit 201, a broken line 81 indicates a torque pulsation that occurs in the second rotor unit 202, and an alternate long and short dash line 82 indicates a torque pulsation that occurs in the rotor 2 formed by combining the first rotor unit 201 and the second rotor unit 202. The torque pulsations of a certain order, which occur in the first rotor unit 201 and the second rotor unit 202 under the same current conditions, are different in amplitude and phase. Thus, when an axial length ratio is set so that the torque pulsations of a specific order have the same amplitude and phases are opposite in the first rotor unit 201 and the second rotor unit 202, torque ripples can be canceled out without reducing an electrical angle average torque in the rotor units as a whole. In this case, the axial length ratio is a ratio of heights of the rotor units.

In the description given above, the slits 22a and 22b are slits, each having an arc-like shape. However, the shapes of the slits 22a and 22b are not limited thereto. Each of the slits 22a and 22b is only required to have a U-like shape extending in the circumferential direction and project toward a radially inner side. Thus, the shape of each of the slits 22a and 22b may be a combination of three or more straight lines, a combination of three or more curved lines, or one arc.

As described above, in the first embodiment, the rotor 2 includes the two-stage rotor units stacked in the axial direction, specifically, the first rotor unit 201 and the second rotor unit 202. The first rotor unit 201 includes the pair of permanent magnets 21a, and the slits 22a, each having the arc-like shape, arranged in one or more rows, which is formed between the pair of permanent magnets 21a, and the second rotor unit 202 includes the pair of permanent magnets 21b, and the slits 22b, each having the arc-like shape, arranged in one or more rows, which is formed between the pair of permanent magnets 21b. In this case, when the angle formed between the two straight lines that connect the positions of both ends of the arc-like shape of each of the slits 22a and 22b and the rotation axis center O of the rotor 2 is defined as the arc angle, at least one of the arc angles 22a and 22b and the number of rows of the slits 22a and 22b are different between the first rotor unit 201 and the second rotor unit 202, which are adjacent to each other in the axial direction. With the configuration described above, the phase of the torque ripple that occurs in each of the rotor units is different. Thus, the torque ripples can be canceled out in the rotor 2 as a whole. As a result, the torque ripple can be reduced. Further, in the first embodiment, the rotor 2 is not allowed to skew. Thus, the output torque is not reduced, and hence the reduction in output torque can be suppressed. Further, in the first embodiment, the magnet magnetic flux of the slits and the magnet magnetic flux of the flux barriers are taken into consideration. Thus, the reduction in torque output due to the reduction in magnet magnetic flux can also be suppressed.

Second Embodiment

Figure 9:
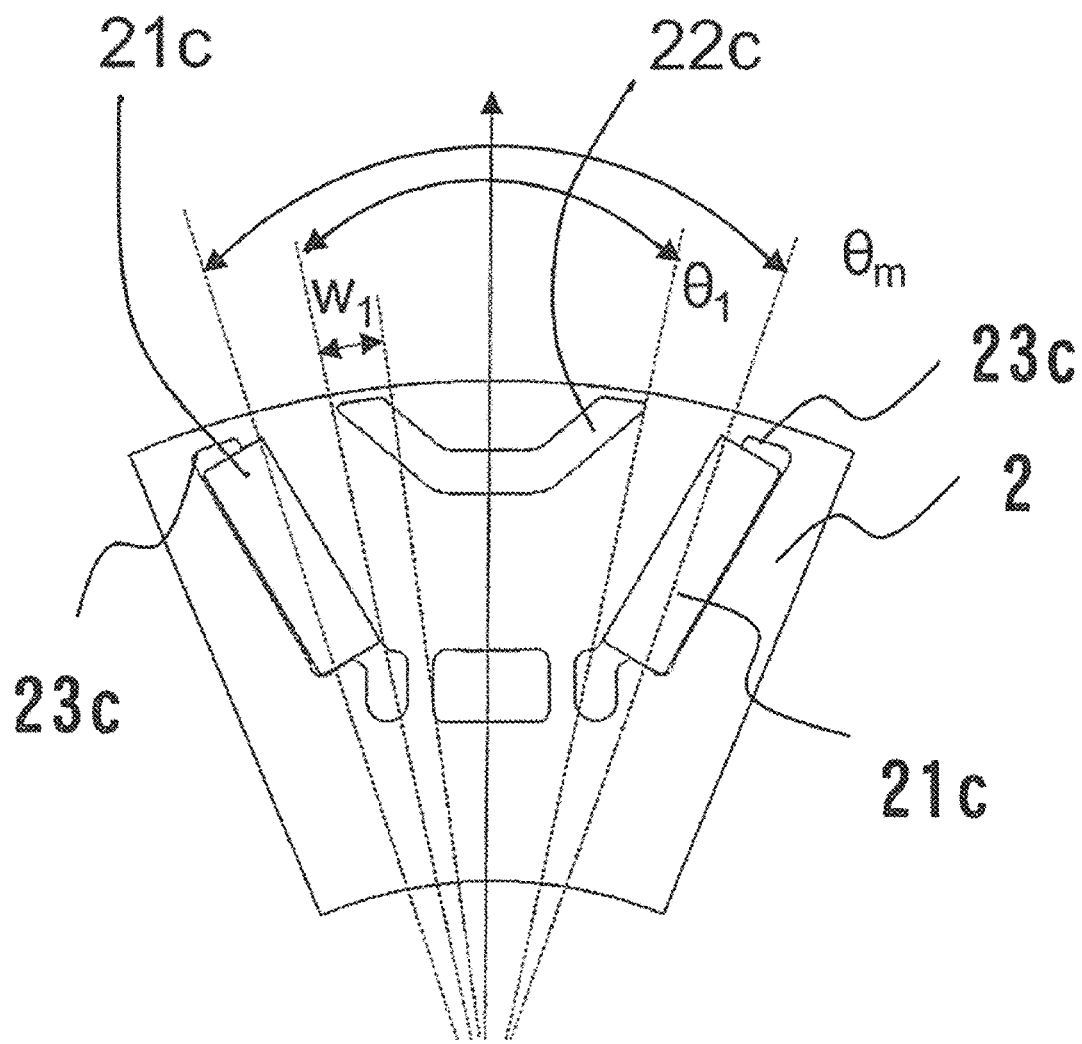
FIG. 9 is a partial sectional view of a first rotor unit of a rotating electric machine according to a second embodiment of the present invention.
Figure 10:
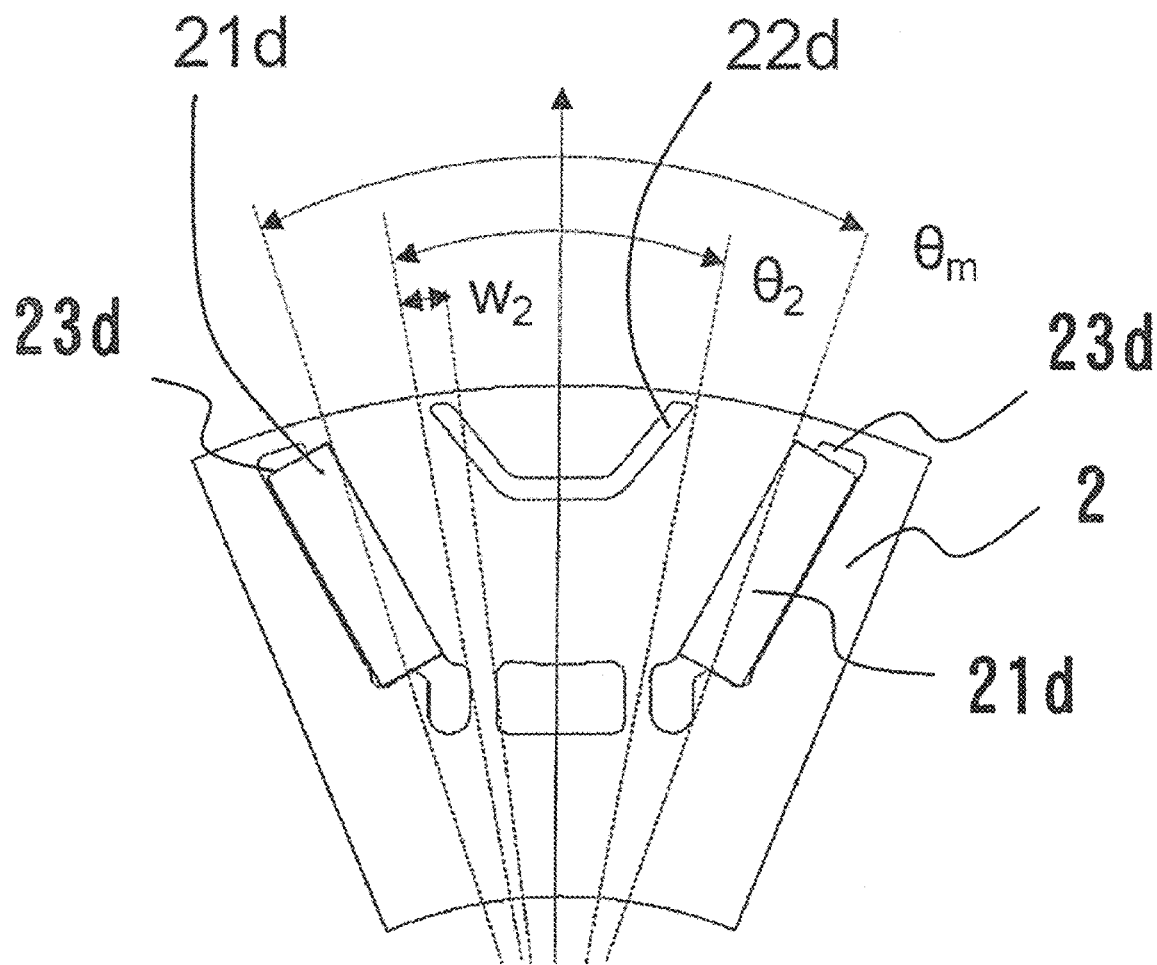
FIG. 10 is a partial sectional view of a second rotor unit of the rotating electric machine according to the second embodiment of the present invention.

FIG. 9 and FIG. 10 are sectional views of the first rotor unit 201 and the second rotor unit 202 of a rotating electric machine according to a second embodiment of the present invention, respectively. Similarly to FIG. 6 and FIG. 7, FIG. 9 and FIG. 10 are illustrations of one magnetic pole portion of eight magnetic poles of the rotor 2. FIG. 9 is an illustration of a cross section taken along a plane perpendicular to the axial direction of the first rotor unit 201. FIG. 10 is an illustration of a cross section taken along a plane perpendicular to the axial direction of the second rotor unit 202.

Differences between the first embodiment described above and the second embodiment are described.

In the first embodiment described above, the slits 22a of the first rotor unit 201 are arranged in three rows, and the slits 22b of the second rotor unit 202 are arranged in two rows. In the second embodiment, however, a slit 22c of the first rotor unit 201 and a slit 22d of the second rotor unit 202 are each arranged in one row.

Further, in the first embodiment described above, the slits 22a arranged in three rows and the slits 22b arranged in two rows all have the same width. In the second embodiment, however, a width of the slit 22c and a width of the slit 22d are different. More specifically, the width of the slit 22c is larger than the width of the slit 22d.

Other configurations are the same as those of the first embodiment, and thus description thereof is herein omitted.

Now, the second embodiment is described in detail.

As illustrated in FIG. 9, as in the first embodiment described above, the first rotor unit 201 includes a pair of permanent magnets 21c, the slit 22c, and a pair of flux barriers 23c. Further, as illustrated in FIG. 10, as in the first embodiment described above, the second rotor unit 202 includes a pair of permanent magnets 21d, the slit 22d, and a pair of flux barriers 23d.

An arc angle of the slit 22c of the first rotor unit 201 is θ1. Meanwhile, an arc angle of the slit 22d of the second rotor unit 202 is θ2. In this case, the arc angle θ1 is larger than the arc angle θ2. Further, as described above, the width of the slit 22c is larger than the width of the slit 22d. In this case, end portions of each of the slits 22c and 22d, which are located in the outer peripheral portion of the rotor 2, are referred to as "outer-peripheral-portion end portions". Edges of the outer-peripheral-portion end portions of each of the slits 22c and 22d are located along the outer periphery of the rotor 2. In this case, a circumferential length w1 indicting a width of each of the outer-peripheral-portion end portions of the slit 22c is larger than a circumferential length w2 indicating a width of each of the outer-peripheral-portion end portions of the slit 22d. The width of the slit 22c is described above as being larger than the width of the slit 22d as a whole. However, the widths are not limited thereto. At least the width of each of the outer-peripheral-portion end portions of the slit 22c is only required to be larger than the width of each of the outer-peripheral-portion end portions of the slit 22d.

Figure 11:
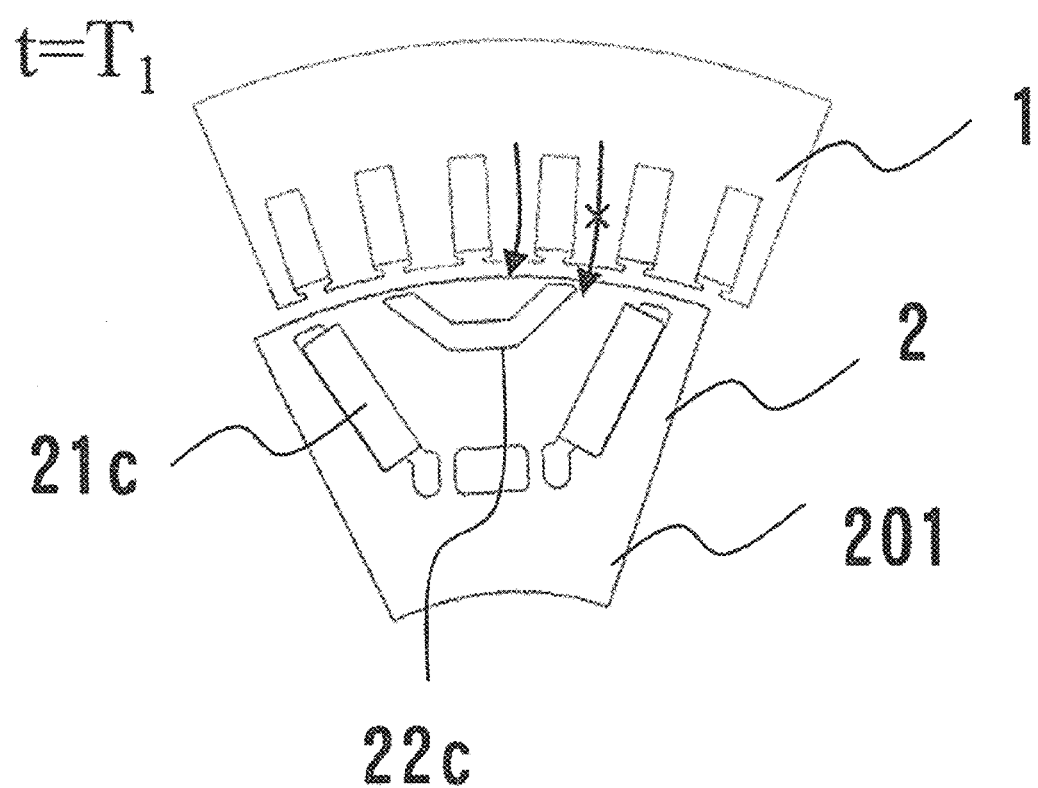
FIG. 11 is a view for illustrating a flow of magnetic flux from a stator in the first rotor unit of the rotating electric machine according to the second embodiment of the present invention.
Figure 12:
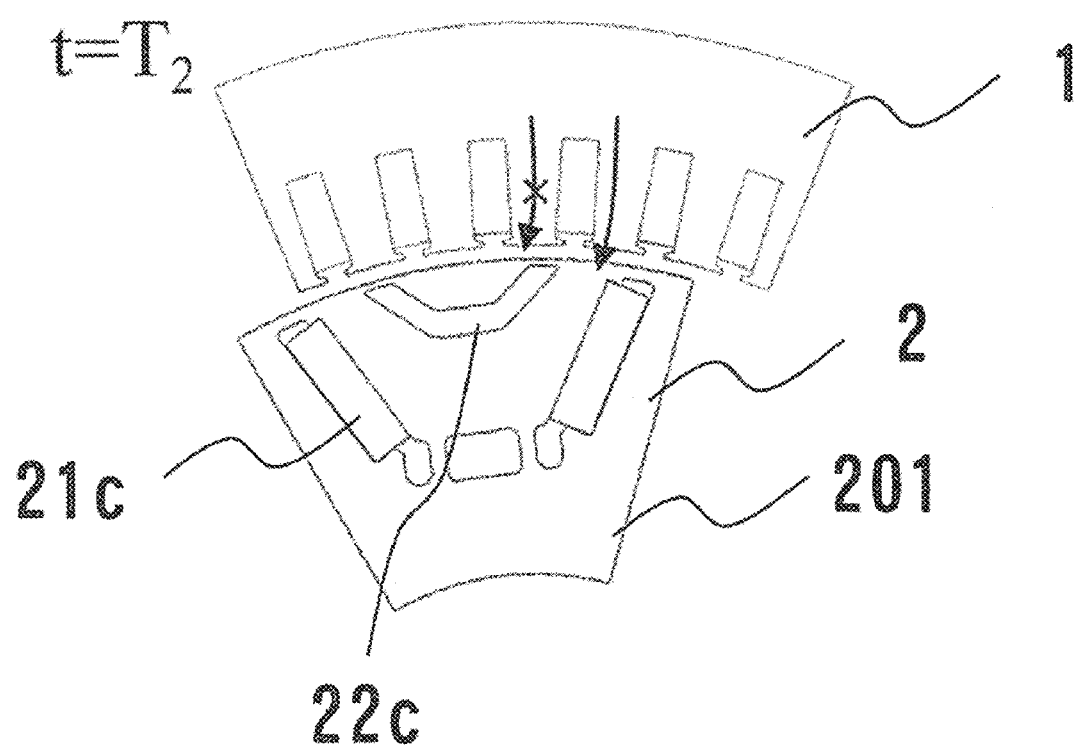
FIG. 12 is a view for illustrating the flow of the magnetic flux from the stator in the first rotor unit of the rotating electric machine according to the second embodiment of the present invention.

FIG. 1 and FIG. 12 are views for illustrating part of a flow of the magnetic flux in the first rotor unit 201 from the stator 1 at a time $t=T_1$ and a time $t=T_2$ in the second embodiment, respectively. In FIG. 11 and FIG. 12, a symbol "x" on an arrow indicates that the flow of the magnetic flux is interrupted by the slit 22c.

Figure 13:
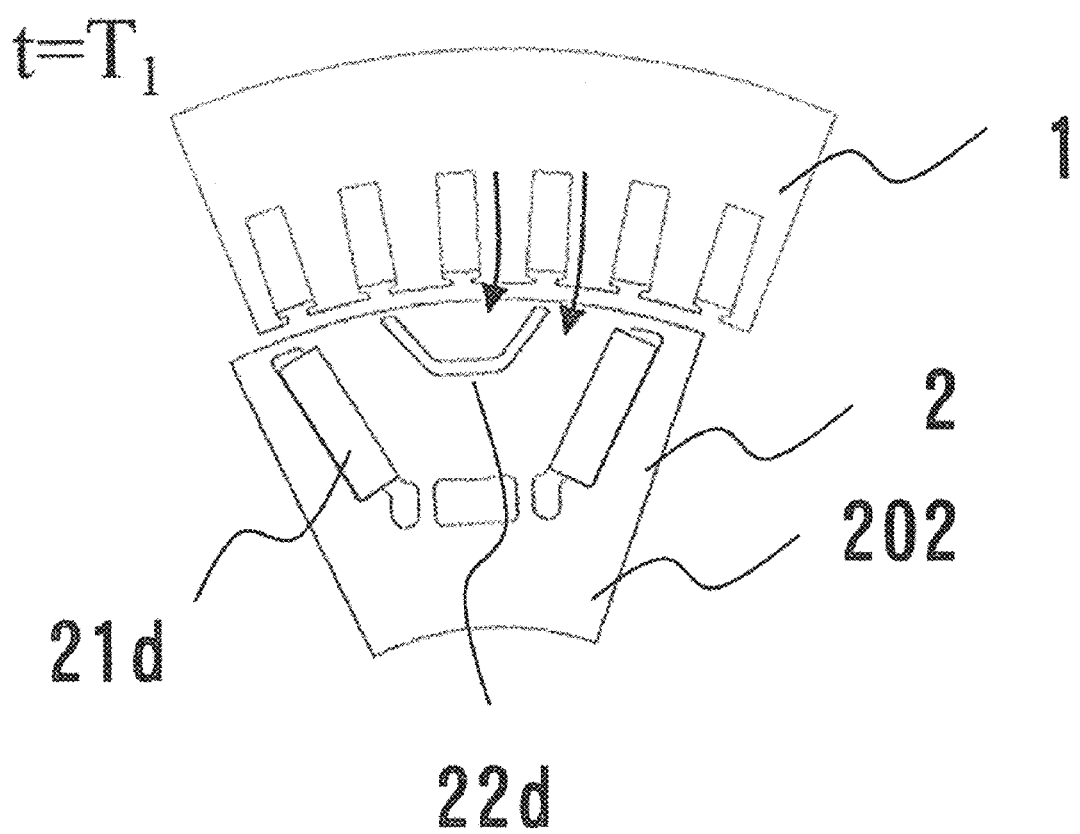
FIG. 13 is a view for illustrating the flow of the magnetic flux from the stator in the second rotor unit of the rotating electric machine according to the second embodiment of the present invention.
Figure 14:
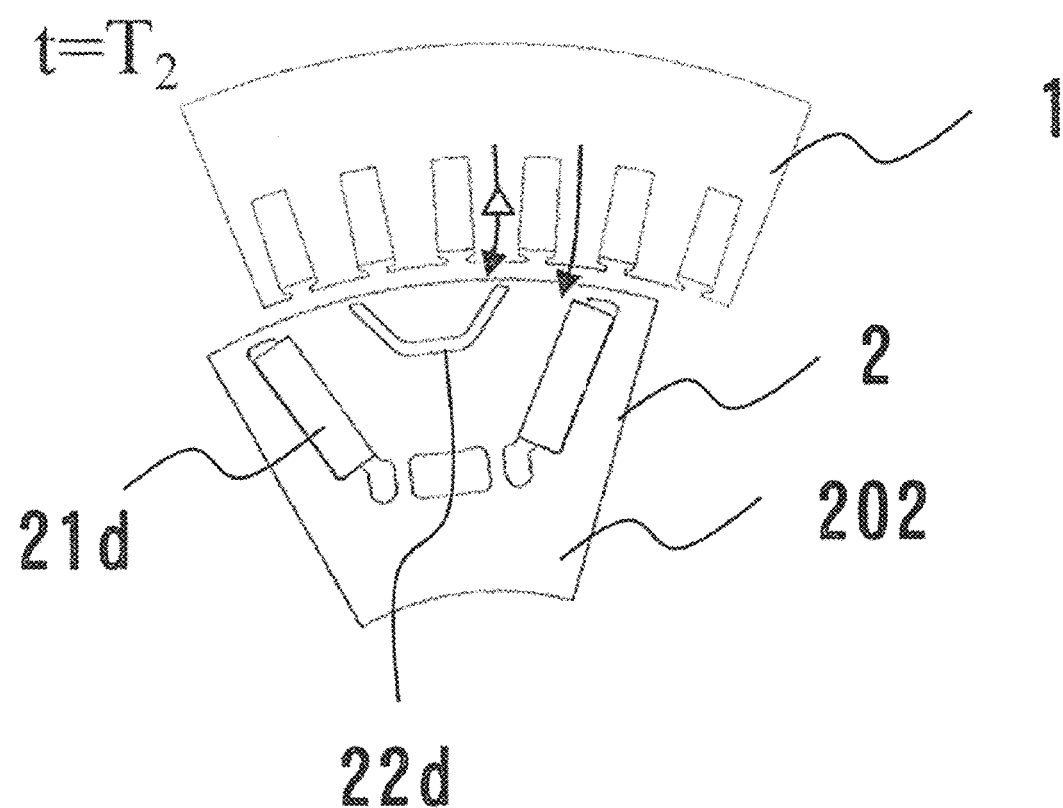
FIG. 14 is a view for illustrating the flow of the magnetic flux from the stator in the second rotor unit of the rotating electric machine according to the second embodiment of the present invention.

FIG. 13 and FIG. 14 are views for illustrating part of a flow of the magnetic flux in the second rotor unit 202 from the stator 1 at the time $t=T_1$ and the time $t=T_2$ in the second embodiment, respectively. In FIG. 14, a symbol "Δ" on an arrow indicates a state in which the flow of the magnetic flux is not completely interrupted by the slit 22d.

First, FIG. 11 and FIG. 12, which are illustrations of the first rotor unit 201, are compared with each other. In FIG. 11 at the time $t=T_1$, the symbol "x" is indicated on a right one of two arrows. Meanwhile, in FIG. 12 at the time $t=T_2$, the symbol "x" is indicated on a left one of two arrows. Thus, it is understood that the timing at which the slit 22c interrupts the magnetic flux from the stator 1 is different depending on the position.

Next, the slit 22c of FIG. 11 and the slit 22d of FIG. 13 both at the time $t=T_1$ are compared with each other. For the slit 22c of FIG. 11, the symbol "x" is indicated on one of the two arrows. Thus, it is understood that the flow of the magnetic flux is interrupted by the slit 22c. Meanwhile, for the slit 22d of FIG. 13, the symbol "x" is not indicated on either of the two arrows. Thus, it is understood that the flow of the magnetic flux is not interrupted by the slit 22d.

Similarly, the slit 22c of FIG. 12 and the slit 22d of FIG. 14 both at another time $t=T_2$ are compared with each other. For the slit 22c of FIG. 12, the symbol "x" is indicated on one of the two arrows. Thus, it is understood that the flow of the magnetic flux is interrupted by the slit 22c. Meanwhile, for the slit 22d of FIG. 14, the symbol "Δ" is indicated on either of the two arrows. Thus, it is understood that the flow of the magnetic flux is not completely interrupted by the slit 22d.

As described above, at any of the time $t=T_1$ and the time $t=T_2$, it is understood that the flow of the magnetic flux from the stator 1 is more efficiently interrupted by the slit 22c of the first rotor unit 201 than by the slit 22d of the second rotor unit 202. This is because the circumferential length w1 of each of the outer-peripheral-portion end portions of the slit 22c is larger than the circumferential length w2 of each of the outer-peripheral-portion end portions of the slit 22d. Specifically, the slit more efficiently interrupts the flow of the magnetic flux from the stator 1 as the circumferential length of each of the outer-peripheral-portion end portions of the slit increases.

As described above, when the circumferential length of each of the outer-peripheral-portion end portions of each of the slits 22c and 22d is changed, the timing of hindering the magnetic flux from the stator 1 can be changed. Thus, in the second embodiment, the circumferential length w1 of each of the outer-periphery-side end portions of the slit 22c and the circumferential length w2 of each of the outer-periphery-side end portions of the slit 22d are set to different values. As described above, the phases of the torque ripples that occur in the first rotor unit 201 and the second rotor unit 202 can be appropriately adjusted by appropriately setting the circumferential length w1 of each of the outer-periphery-side end portions of the slit 22c and the circumferential length w2 of each of the outer-periphery-side end portions of the slit 22d to suitable values.

As described above, in the second embodiment, the circumferential length w1 of each of the outer-periphery-side end portions of the slit 22c having the arc-like shape and the circumferential length w2 of each of the outer-periphery-side end portions of the slit 22d having the arc-like shape are different between the first rotor unit 201 and the second rotor unit 202, which are adjacent to each other in the axial direction. Thus, the phase of the torque ripple that occurs in each of the rotor units is different. Thus, the torque ripples can be canceled out in the rotor 2 as a whole. As a result, the torque ripple can be reduced while suppressing the reduction in torque output.

Third Embodiment

Figure 15:
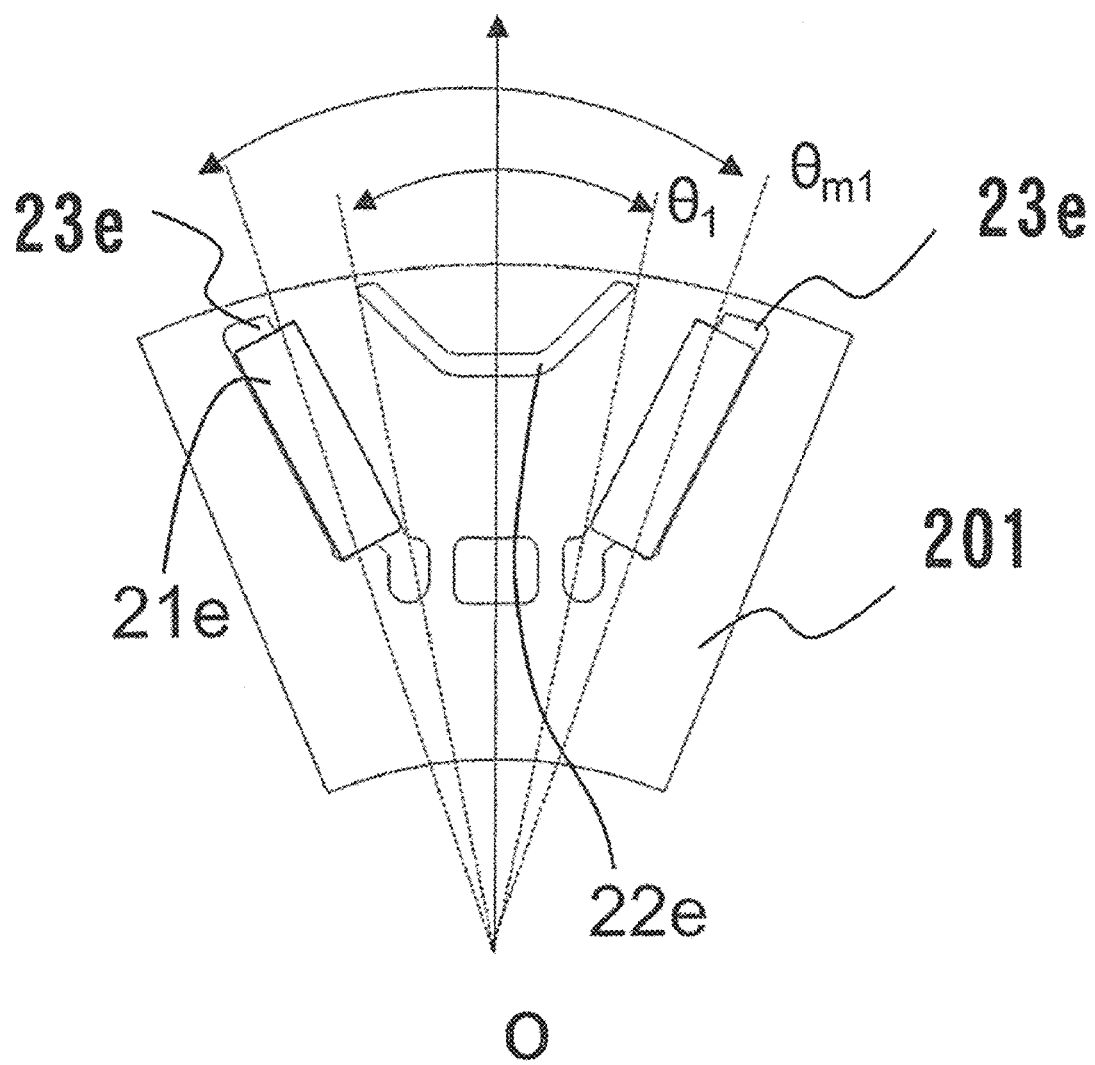
FIG. 15 is a partial sectional view of a first rotor unit of a rotating electric machine according to a third embodiment of the present invention.
Figure 16:
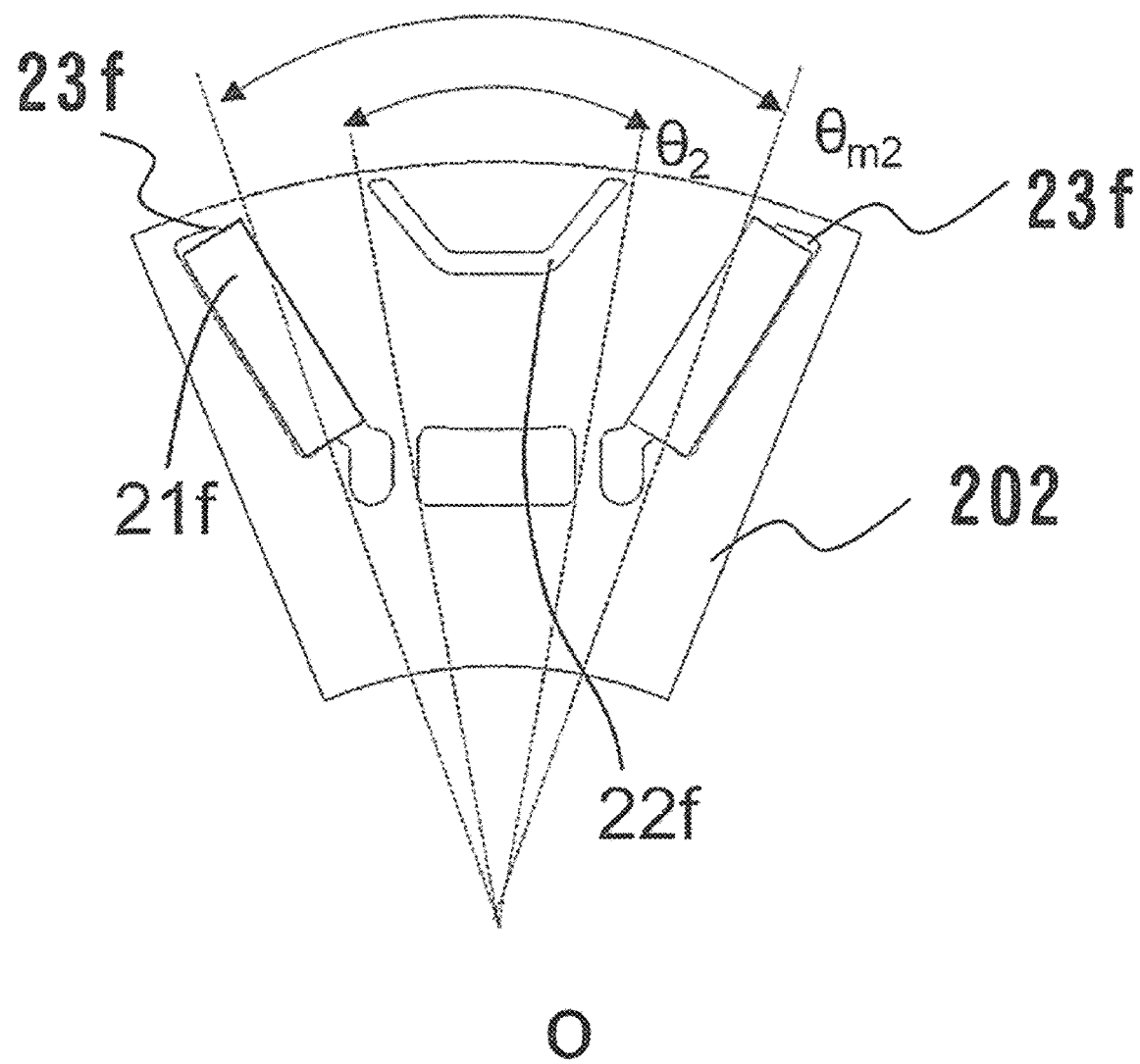
FIG. 16 is a partial sectional view of a second rotor unit of the rotating electric machine according to the third embodiment of the present invention.

FIG. 15 and FIG. 16 are sectional views of the first rotor unit 201 and the second rotor unit 202 of a rotating electric machine according to a third embodiment of the present invention, respectively. Similarly to FIG. 6 and FIG. 7, FIG. 15 and FIG. 16 are illustrations of one magnetic pole portion of eight magnetic poles of the rotor 2. FIG. 15 is an illustration of a cross section taken along a plane perpendicular to the axial direction of the first rotor unit 201. FIG. 16 is an illustration of a cross section taken along a plane perpendicular to the axial direction of the second rotor unit 202.

Differences between the first and second embodiments described above and the third embodiment are described.

In the first embodiment described above, the angle θm formed between the pair of flux barriers 23a of the first rotor unit 201 and the angle θm formed between the pair of flux barriers of the second rotor unit 202 are the same. In the third embodiment, however, an angle θm1 formed between a pair of flux barriers 23e of the first rotor unit 201 and an angle θm2 formed between a pair of flux barriers 23f of the second rotor unit 202 are different.

In the first embodiment described above, the slits 22a of the first rotor unit 201 are arranged in three rows, and the slits 22b of the second rotor unit 202 are arranged in two rows. In the third embodiment, however, a slit 22e of the first rotor unit 201 and a slit 22f of the second rotor unit 202 are each arranged in one row.

Further, in the second embodiment described above, the width of the slit 22c of the first rotor unit 201 and the width of the slit 22d of the second rotor unit 202 are different. In the third embodiment, however, a width of the slit 22e of the first rotor unit 201 and a width of the slit 22f of the second rotor unit 202 are the same.

Other configurations are the same as those of the first embodiment or the second embodiment, and hence description thereof is omitted.

Now, the third embodiment is described in detail.

As illustrated in FIG. 15, as in the first embodiment described above, the first rotor unit 201 includes a pair of permanent magnets 21e, the slit 22e, and the pair of flux barriers 23e. Further, as illustrated in FIG. 16, the second rotor unit 202 includes a pair of permanent magnets 21f, the slit 22f, and the pair of flux barriers 23f.

As described above, in the third embodiment, the angle θm1 formed between the pair of flux barriers 23e of the first rotor unit 201 and the angle θm2 formed between the pair of flux barriers 23f of the second rotor unit 202 are different. Further, in the third embodiment, the arc angle θ1 of the slit 22e of the first rotor unit 201 is different from the arc angle θ2 of the slit 22f of the second rotor unit 202.

As a result, the magnetic paths for the magnetic flux passing on the outer periphery side of the rotor 2 are different. Thus, a way of passage of the magnetic flux from the stator 1 is different in each of the first rotor unit 201 and the second rotor unit 202. As a result, a pulsation of a torque ripple that occurs can be reduced.

As described above, in the third embodiment, the angle θm1 formed between the pair of flux barriers 23e of the first rotor unit 201 and the angle θm2 formed between the pair of flux barriers 23f of the second rotor unit 202 are different. Further, in the third embodiment, the arc angle θ1 of the slit 22e of the first rotor unit 201 is different from the arc angle θ2 of the slit 22f of the second rotor unit 202. Thus, a phase of the torque ripple that occurs is different for each of the rotor units. Thus, the torque ripples can be canceled out in the rotor 2 as a whole. As a result, the torque ripple can be reduced while the reduction in torque output is suppressed.

Fourth Embodiment

Figure 17:
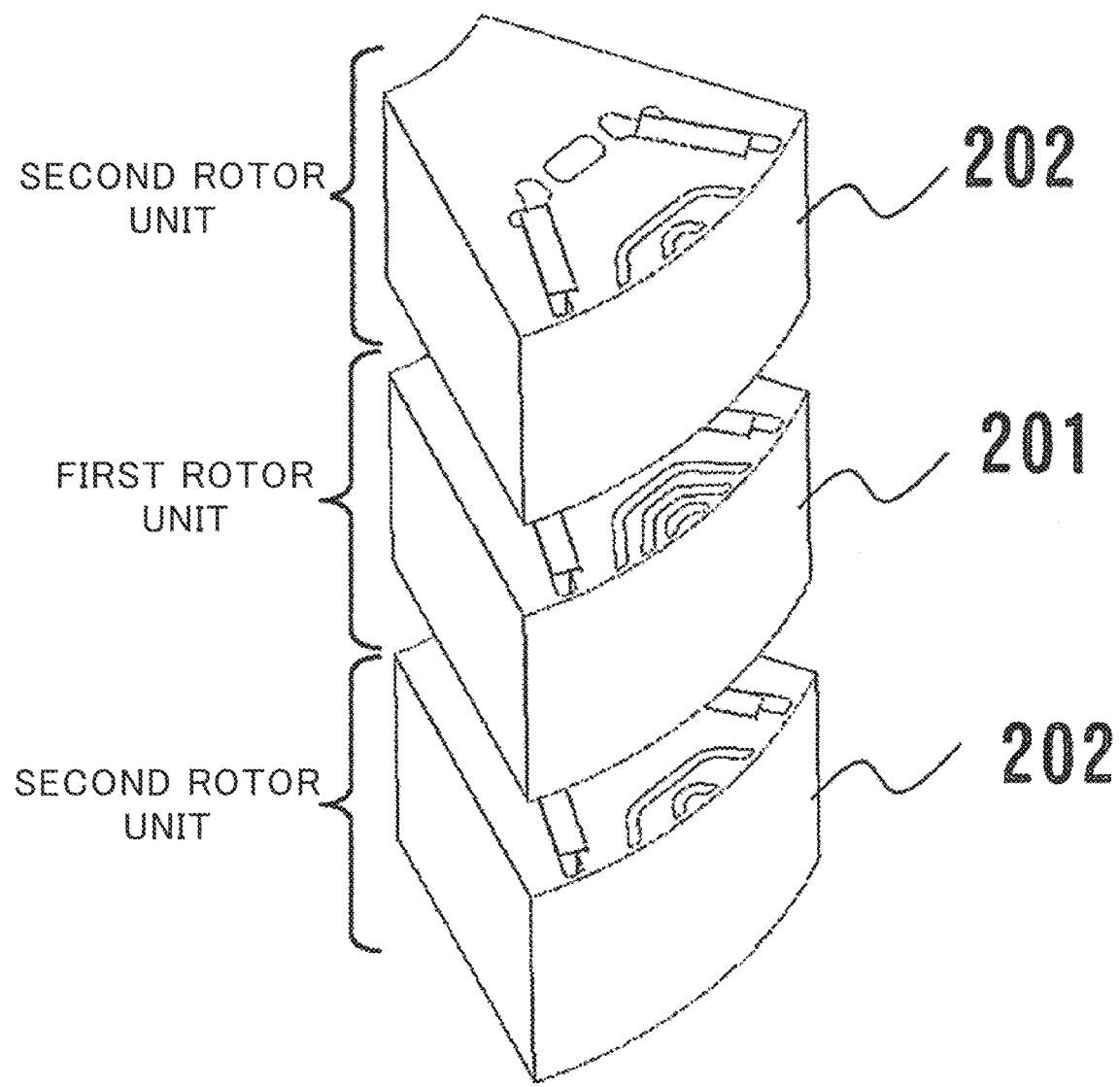
FIG. 17 is an exploded perspective view for illustrating a configuration of a rotor of a rotating electric machine according to a fourth embodiment of the present invention for one pole.

FIG. 17 is an exploded perspective view of the rotor 2 according to a fourth embodiment of the present invention. FIG. 17 is an illustration of one magnetic pole portion of eight magnetic poles of the rotor 2. As illustrated in FIG. 17, in the fourth embodiment, the rotor 2 includes three-stage rotor units. Other configurations are the same as those of the first embodiment.

As illustrated in FIG. 17, among the three-stage rotor units, a first-stage rotor unit and a third-stage rotor unit when counted from a lower side have the same shape, and the shape of the first-stage rotor unit and a shape of a second-stage rotor unit are different. More specifically, for example, each of the first-stage rotor unit and the third-stage rotor unit is formed of the second rotor unit 202 described in the first embodiment, and the second-stage rotor unit is formed of the first rotor unit 201 described in the first embodiment. As described above, the multi-stage rotor units include two kinds of rotor units, which correspond to the first rotor unit 201 and the second rotor unit 202, and the first rotor unit 201 and the second rotor units 202 are alternately stacked.

A phase of a torque ripple that occurs changes in accordance with a position in an axial direction of the rotation axis of the rotor 2. More specifically, the phase of the torque ripple at both ends of the rotation axis of the rotor 2 and the phase of the torque ripple at a center portion thereof become opposite. Thus, when the rotor 2 includes the three-stage rotor units and a different configuration is used only for the second-stage rotor unit, a mode of vibration that occurs so as to bend the rotation axis X of the rotor 2 in a direction perpendicular to the rotation axis X can be changed. Thus, when the rotor 2 is designed with the three-stage rotor units so that the mode of vibration does not match a mode of a resonance frequency of the rotor 2, the vibration and noise can be reduced.

As described above, in the fourth embodiment, the rotor 2 includes the three-stage rotor units. Further, the first rotor unit 201 and the second rotor units 202 are alternately stacked. As a result, the phase of the torque ripple that occurs is different in each of the rotor units. Thus, the torque ripples can be canceled out in the rotor 2 as a whole. Accordingly, the torque ripple can be reduced. Further, the electromagnetic force generated in each of the rotor units is different. Thus, the mode of the resonance frequency, which may deform the rotation axis X, can be changed in a height direction of the rotation axis, and hence the vibration and the noise can be reduced.

In the fourth embodiment, description has been given of the example in which the three-stage rotor units are stacked. However, a suitable number of stages may be used as long as the number of stages is an odd number. Even in this case, it is apparent that the same effects are obtained.

Further, in the fourth embodiment, the second-stage rotor unit has the configuration different from the configuration of the first-stage rotor unit and the third-stage rotor unit. Further, the configurations of the rotor units are not limited thereto, and the configuration of the third-stage rotor unit may be different from that of the first-stage rotor unit and the second-stage rotor unit, or the configuration of the first-stage rotor unit may be different from that of the second stage rotor unit and the third-stage rotor unit. Further, three kinds of rotor units may be used so that all of the first-stage rotor unit, the second-stage rotor unit, and the third-stage rotor unit have configurations different from each other. As described above, in the fourth embodiment, at least one of the arc angle of the slit and the number of rows of the slits is only required to be different between at least two of the rotor units.

Fifth Embodiment

Figure 18:
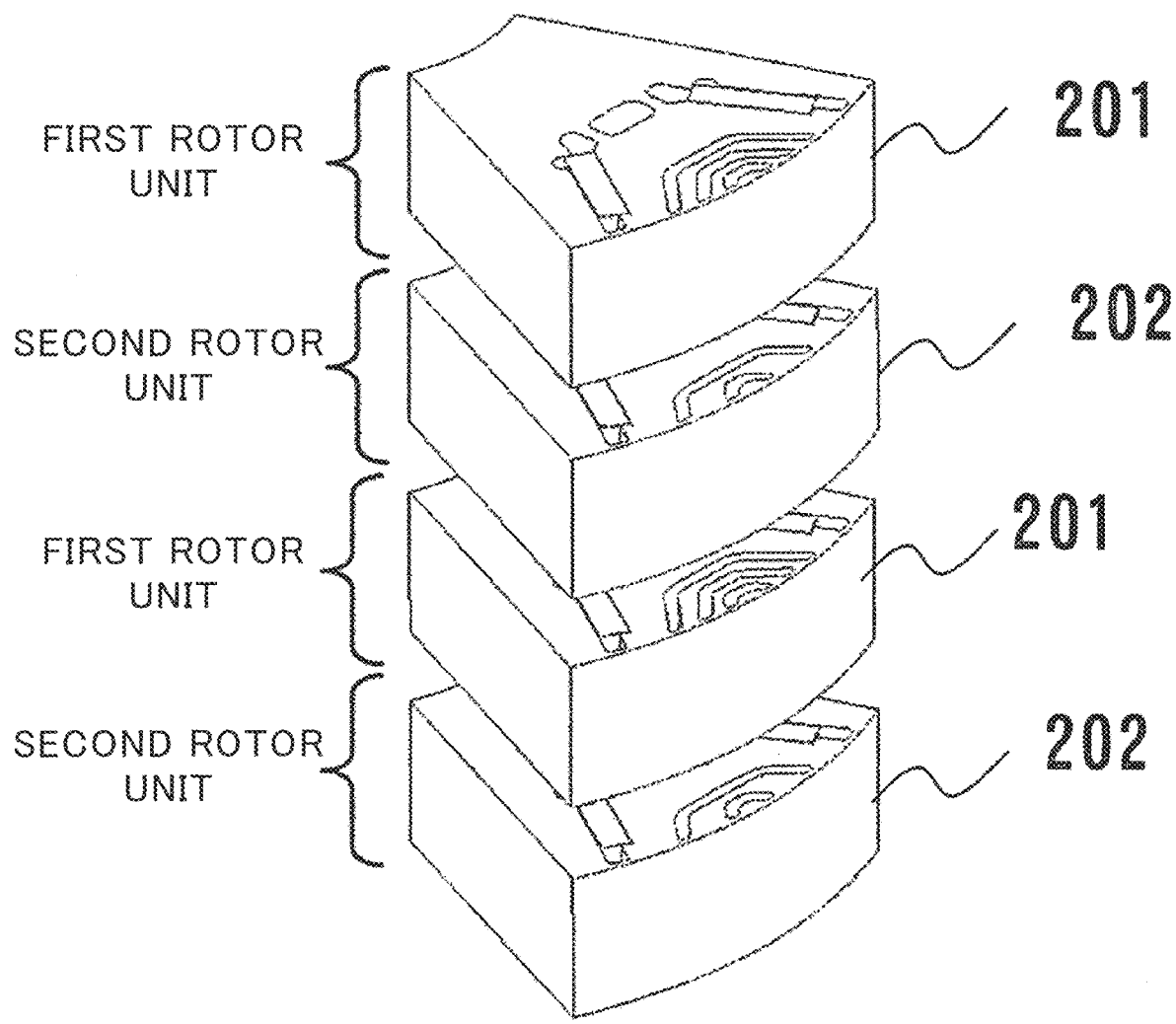
FIG. 18 is an exploded perspective view for illustrating a configuration of a rotor of a rotating electric machine according to a fifth embodiment of the present invention for one pole.

FIG. 18 is an exploded perspective view of the rotor 2 according to a fifth embodiment of the present invention. FIG. 18 is an illustration of one magnetic pole portion of eight magnetic poles of the rotor 2. As illustrated in FIG. 18, in the fifth embodiment, the rotor 2 includes four-stage rotor units. Other configurations are the same as those of the first embodiment.

As illustrated in FIG. 18, among the four-stage rotor units, a first-stage rotor unit and a third-stage rotor unit when counted from a lower side have the same shape, and the shape of the second-stage rotor unit and a shape of a fourth-stage rotor unit are the same. However, the shape of the first-stage rotor unit and the shape of the second-stage rotor unit are different. More specifically, for example, each of the first-stage rotor unit and the third-stage rotor unit is formed of the second rotor unit 202 described in the first embodiment, and the second-stage rotor unit and the fourth-stage rotor unit are formed of the first rotor unit 201 described in the first embodiment. As described above, the multi-stage rotor units include two kinds of rotor units, which correspond to the first rotor unit 201 and the second rotor unit 202, and the first rotor unit 201 and the second rotor units 202 are alternately stacked.

A phase of a torque ripple that occurs changes in accordance with a position in an axial direction of the rotation axis of the rotor 2. More specifically, the phase of the torque ripple at both ends of the rotation axis of the rotor 2 and the phase of the torque ripple at a center portion thereof become opposite. Thus, when the rotor 2 includes the four-stage rotor units and a different configuration is used only for the second-stage rotor unit and the fourth-stage rotor unit, a mode of vibration that occurs so as to bend the rotation axis of the rotor 2 in a direction perpendicular to the rotation axis can be changed. Thus, when the rotor 2 is designed with the four-stage rotor units so that the mode of vibration does not match a mode of a resonance frequency of the rotor 2, the vibration and noise can be reduced.

As described above, in the fifth embodiment, the rotor 2 includes the four-stage rotor units. Further, the first rotor unit 201 and the second rotor units 202 are alternately stacked. As a result, the phase of the torque ripple that occurs is different in each of the rotor units. Thus, the torque ripples can be canceled out in the rotor 2 as a whole. Accordingly, the torque ripple can be reduced. Further, the electromagnetic force generated in each of the rotor units is different. Thus, the mode of the resonance frequency, which may deform the rotation axis X, can be changed in a height direction of the rotation axis, and hence the vibration and the noise can be reduced.

In the fifth embodiment, description has been given of the example in which the four-stage rotor units are stacked. However, a suitable number of stages may be used as long as the number of stages is an even number. Even in this case, it is apparent that the same effects are obtained.

In the fifth embodiment, description has been given of the case in which the first rotor units 201 and the second rotor units 202 are alternately stacked. However, the configuration of the rotor 2 is not limited thereto. For example, the first rotor unit 201, the second rotor unit 202, the second rotor unit 202, and the first rotor unit 201 may be stacked in the stated order from the lower side. Further, three kinds of rotor units may be used so that the first rotor unit 201, the second rotor unit 202, the second rotor unit 202, and a third rotor unit are stacked in the stated order from the lower side. Alternatively, the first rotor unit 201, the first rotor unit 201, the second rotor unit 202, and the third rotor unit may be stacked in the stated order from the lower side. Further, four kinds of rotor units may be used so that all of the first-stage to fourth-stage rotor units have configurations different from each other. Further, the order of stacking may be an appropriate order. As described above, in the fifth embodiment, at least one of the arc angle of the slit and the number of rows of the slits is only required to be different between at least two of the rotor units.

Sixth Embodiment

Figure 19:
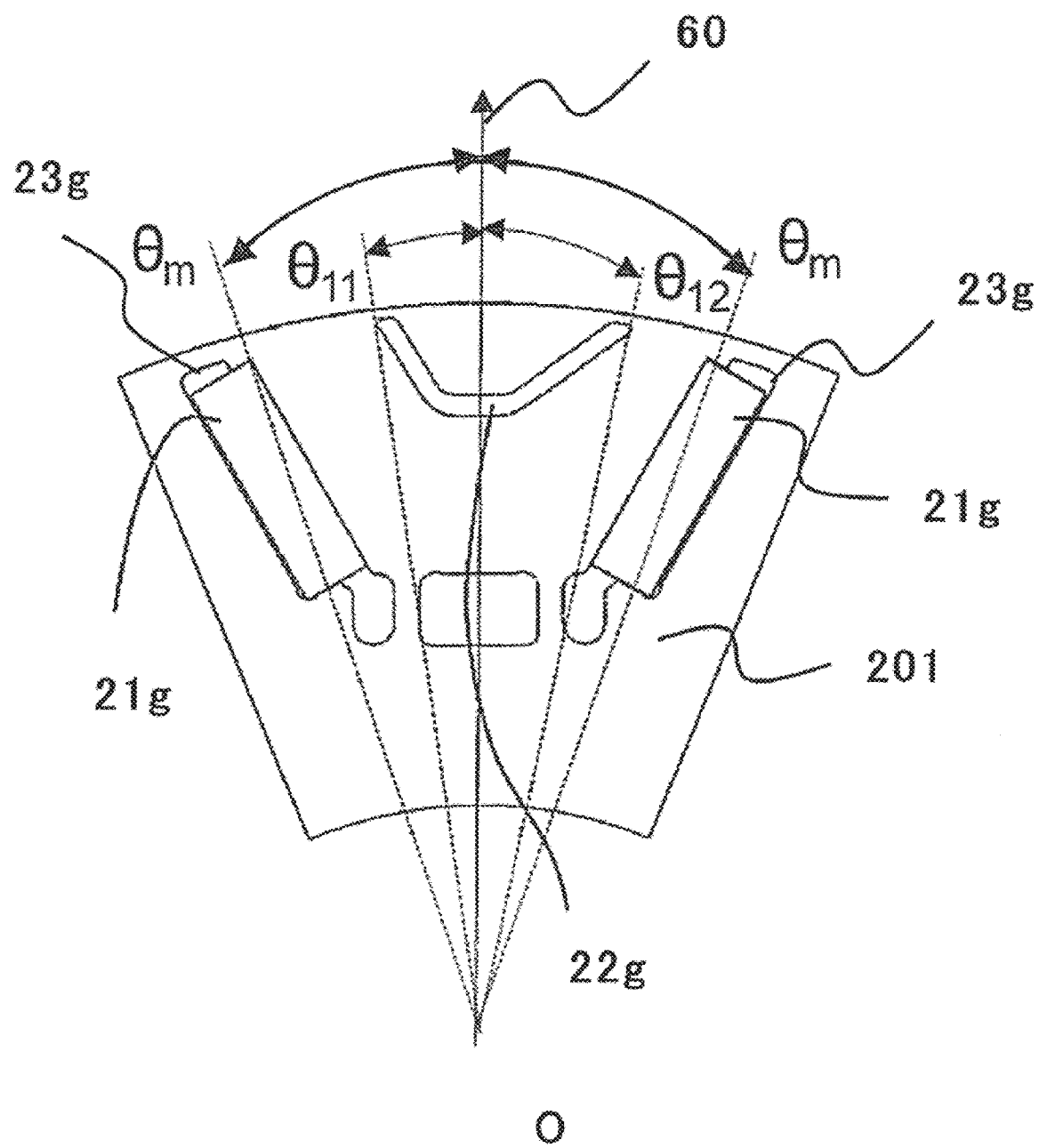
FIG. 19 is a partial sectional view of a first rotor unit of a rotating electric machine according to a sixth embodiment of the present invention.

FIG. 19 is a view for illustrating a sectional shape of the first rotor unit 201 of the rotor 2 according to a sixth embodiment of the present invention. FIG. 19 is an illustration of one magnetic pole portion of eight magnetic poles of the rotor 2. FIG. 19 is an illustration of a cross section taken along a plane perpendicular to the axial direction of the first rotor unit 201.

Figure 20:
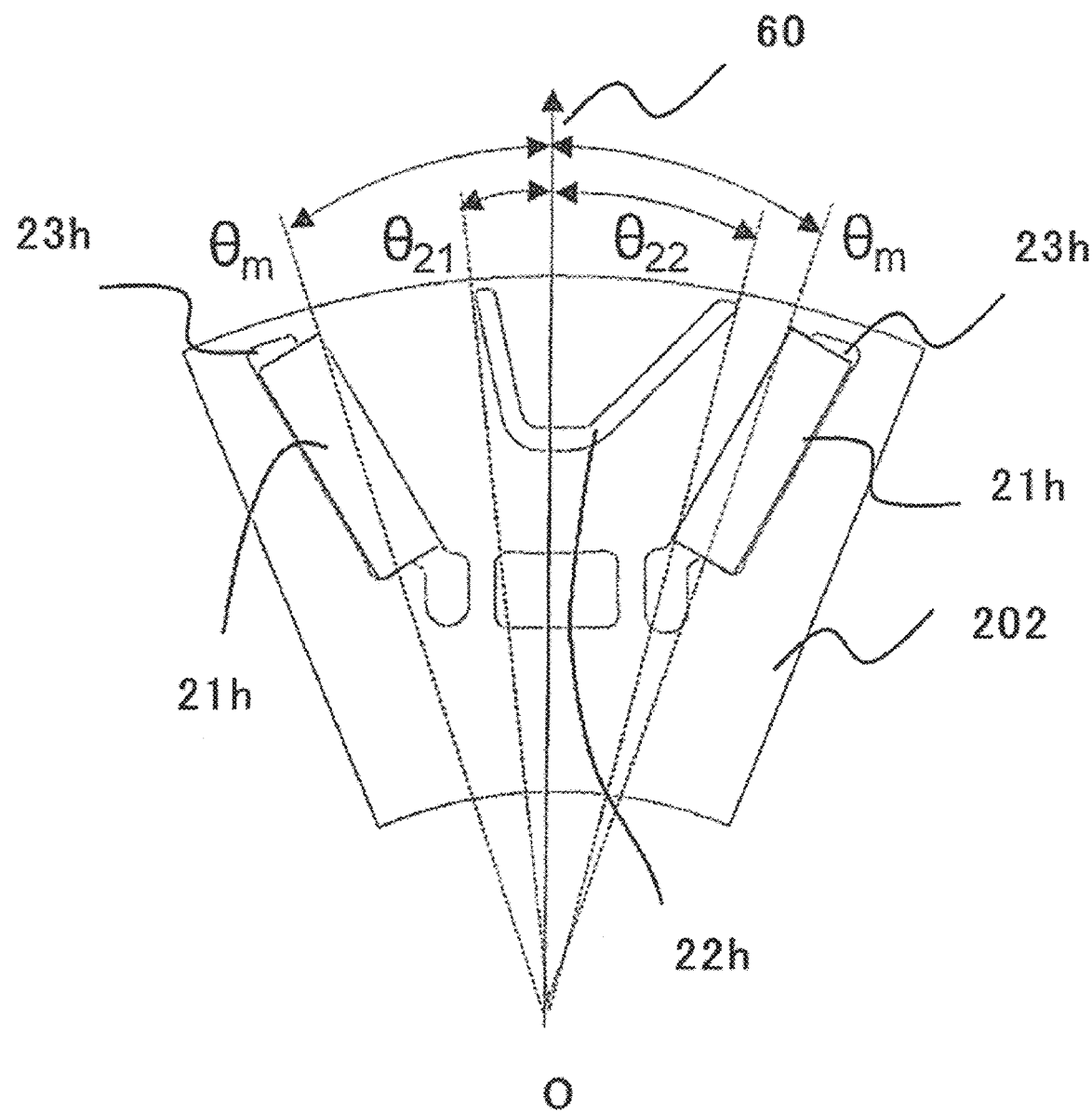
FIG. 20 is a partial sectional view of a second rotor unit of the rotating electric machine according to the sixth embodiment of the present invention.

FIG. 20 is a view for illustrating a sectional shape of the second rotor unit 202 of the rotor 2 according to the sixth embodiment of the present invention. FIG. 20 is an illustration of one magnetic pole portion of eight magnetic poles of the rotor 2. FIG. 20 is an illustration of a cross section taken along a plane perpendicular to the axial direction of the second rotor unit 202.

Differences between the third embodiment described above and the sixth embodiment are described.

In the third embodiment described above, each of the slit 22e of the first rotor unit 201 and the slit 22f of the second rotor unit 202 has a line-symmetric shape with respect to the d axis 60. In the sixth embodiment, however, neither a slit 22g of the first rotor unit 201 nor a slit 22h of the second rotor unit 202 has a line-symmetric shape with respect to the d axis 60.

Further, in the third embodiment described above, the angle θm1 formed between the pair of flux barriers 23e of the first rotor unit 201 and the angle θm2 formed between the pair of flux barriers 23f of the second rotor unit 202 are different from each other. At the same time, the arc angle θ1 of the slit 22e of the first rotor unit 201 and the arc angle θ2 of the slit 22f of the second rotor unit 202 are different from each other.

Meanwhile, in the sixth embodiment, the angle θm formed between a pair of flux barriers 23g of the first rotor unit 201 and the angle θm formed between a pair of flux barriers 23h of the second rotor unit 202 are the same. At the same time, the arc angle θ1 of the slit 22g of the first rotor unit 201 and the arc angle θ2 of the slit 22h of the second rotor unit 202 are the same.

Other configurations are the same as any one of the first embodiment to the fifth embodiment, and hence description thereof is omitted.

Now, the sixth embodiment is described in detail.

As illustrated in FIG. 19, as in the first embodiment described above, the first rotor unit 201 includes a pair of permanent magnets 21g, the slit 22g, and the pair of flux barriers 23e. Further, as illustrated in FIG. 20, the second rotor unit 202 includes a pair of permanent magnets 21h, the slit 22h, and the pair of flux barriers 23h.

As described above, in the sixth embodiment, the slit 22g of the first rotor unit 201 is not line-symmetric with respect to the d axis 60. Thus, in the following description, as illustrated in FIG. 19, the arc angle of the slit 22g is divided into two by the d axis as a borderline. An arc angle on an advancing side in a rotating direction of the rotor 2 is represented as "θ11", and an arc angle on a returning side in the rotating direction is represented as "θ12". Thus, the arc angle of the slit 22g is equal to θ11+θ12. In this case, the arc angle θ11 on the advancing side in the rotating direction and the arc angle θ12 on the returning side in the rotating direction are different from each other.

Similarly, the slit 22h of the second rotor unit 202 is not line-symmetric with respect to the d axis 60. Thus, in the following description, the arc angle of the slit 22h is divided into two by the d axis as a borderline. An arc angle on the advancing side in the rotating direction is represented as "θ21", and an arc angle on the returning side in the rotating direction is represented as "θ22". Thus, the arc angle of the slit 22h is equal to θ21+θ22. In this case, the arc angle θ21 on the advancing side in the rotating direction and the arc angle θ22 on the returning side in the rotating direction are different from each other.

Further, when FIG. 19 and FIG. 20 are compared with each other, the arc angle θ11 of the slit 22g on the advancing side in the rotating direction, which is illustrated in FIG. 19, and the arc angle θ21 of the slit 22h on the advancing side in the rotating direction, which is illustrated in FIG. 20, are different from each other. Similarly, the arc angle θ12 of the slit 22g on the returning side in the rotating direction, which is illustrated in FIG. 19, and the arc angle θ22 of the slit 22h on the returning side in the rotating direction, which is illustrated in FIG. 20, are different from each other.

In the sixth embodiment, the arc angle of the slit 22g and the arc angle of the slit 22h are set to different angles for each of the first rotor unit 201 and the second rotor unit 202. As a result, a phase of a torque ripple that occurs in the first rotor unit 201 and a phase of a torque ripple that occurs in the second rotor unit 202 can be set so as to be different from each other.

Further, in the sixth embodiment, the arc angle on the advancing side in the rotating direction and the arc angle on the returning side in the rotating direction are set to different angles in each of the first rotor unit 201 and the second rotor unit 202. Accordingly, a current advance angle at which the reluctance torque has a peak value can be shifted. With such a shift, the current advance angle at which the reluctance torque has a peak value can be set closer to a current advance angle at which magnet torque has a peak value. As a result, maximum torque can be improved.

As described above, in the sixth embodiment, the arc angle θ11 on the advancing side in the rotating direction and the arc angle θ12 on the returning side in the rotating direction are different from each other in the first rotor unit 201, and the arc angle θ21 on the advancing side in the rotating direction and the arc angle θ22 on the returning side in the rotating direction are different from each other in the second rotor unit 202. Further, the arc angle θ11 on the advancing side in the rotating direction in the first rotor unit 201 and the arc angle θ21 on the advancing side in the rotating direction in the second rotor unit 202 are different from each other, and the arc angle θ12 on the returning side in the rotating direction in the first rotor unit 201 and the arc angle θ22 on the returning side in the rotating direction in the second rotor unit are different from each other. As a result, the phases of the torque ripples that occur in the rotor units are different. Thus, the torque ripples can be canceled out in the rotor 2 as a whole. Further, the arc angle of the slit on the advancing side in the rotating direction and that on the returning side in the rotating direction are set different from each other. As a result, the phase of the magnet magnetic flux can be shifted to the advancing side in the rotating direction, and a phase of reluctance magnetic flux can be shifted to the returning side in the rotating direction. As a result, the current advance angle at which the magnet torque has a peak and the current advance angle at which the reluctance torque has a peak can be set closer to each other. Thus, the output torque can be increased.

Seventh Embodiment

Figure 21:
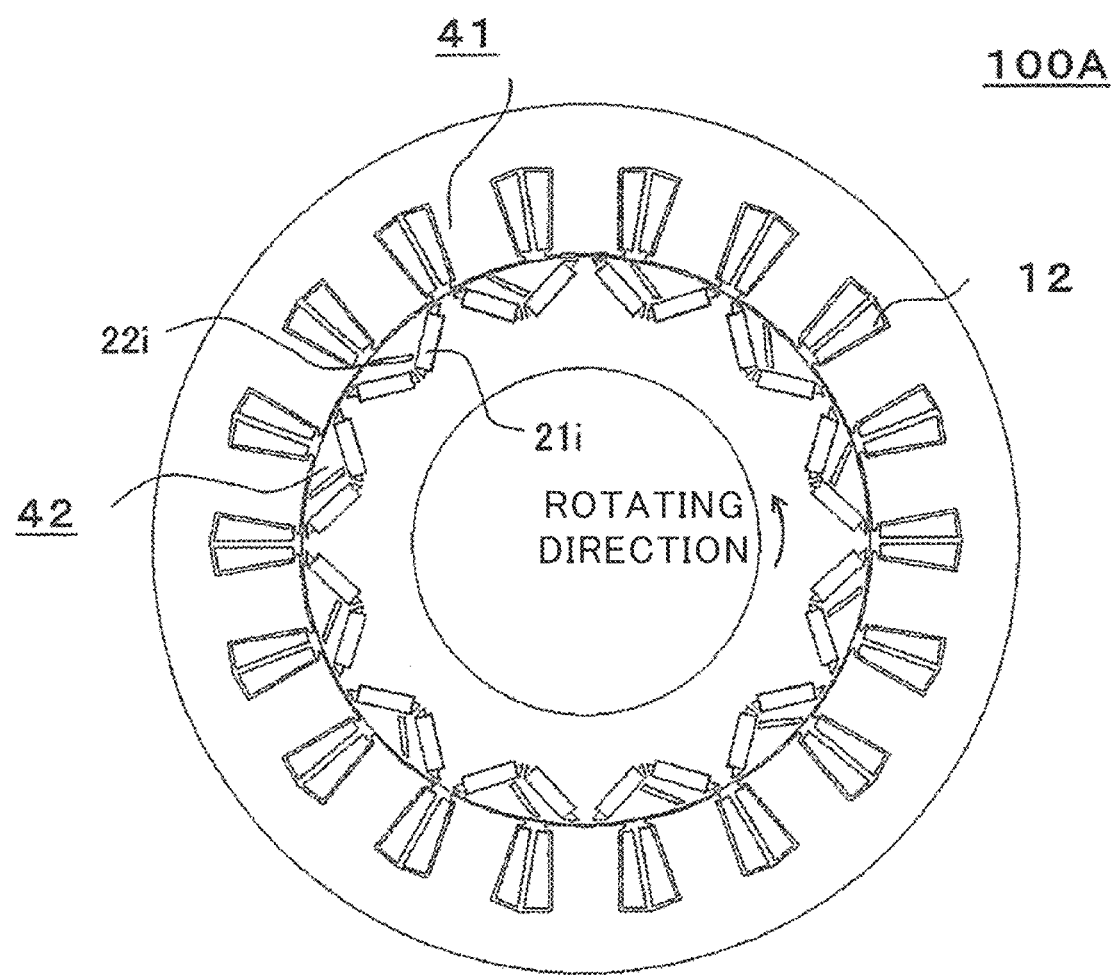
FIG. 21 is a sectional view taken along the line A-A of FIG. 1, for illustrating a configuration of a rotating electric machine according to a seventh embodiment of the present invention.

FIG. 21 is a plan view for illustrating a configuration of a rotating electric machine according to a seventh embodiment of the present invention. A rotating electric machine 100A according to the seventh embodiment includes a stator 41 and a rotor 42. In the seventh embodiment, the rotating electric machine 100A is described by taking a 12-pole 18-slot three-phase concentrated-winding permanent magnet rotating electric machine as an example.

An overall configuration of the rotating electric machine 100A according to the seventh embodiment is basically the same as that of FIG. 1, and hence description thereof is herein omitted.

Configurations of the stator 41 and the rotor 42 of the rotating electric machine 100A according to the seventh embodiment are basically the same as those of the stator 1 and the rotor 2, which have been described in the first embodiment, although the number of poles and the number of slots are different. Hence, description thereof is herein omitted. In the first embodiment described above, the stator coil 12 is wound around the teeth 103 provided to the stator core 10 in the distributed winding pattern. The seventh embodiment is different from the first embodiment in that the stator coil 12 is wound around the teeth 103 provided to the stator core 10 in a concentrated winding pattern.

Further, in the seventh embodiment, the rotor 42 is formed by stacking two-stage rotor units in an axial direction of the rotor 42, as in the first embodiment. In the following description, a first-stage rotor unit is referred to as "first rotor unit 203", and a second-stage rotor unit is referred to as "second rotor unit 204".

Figure 22:
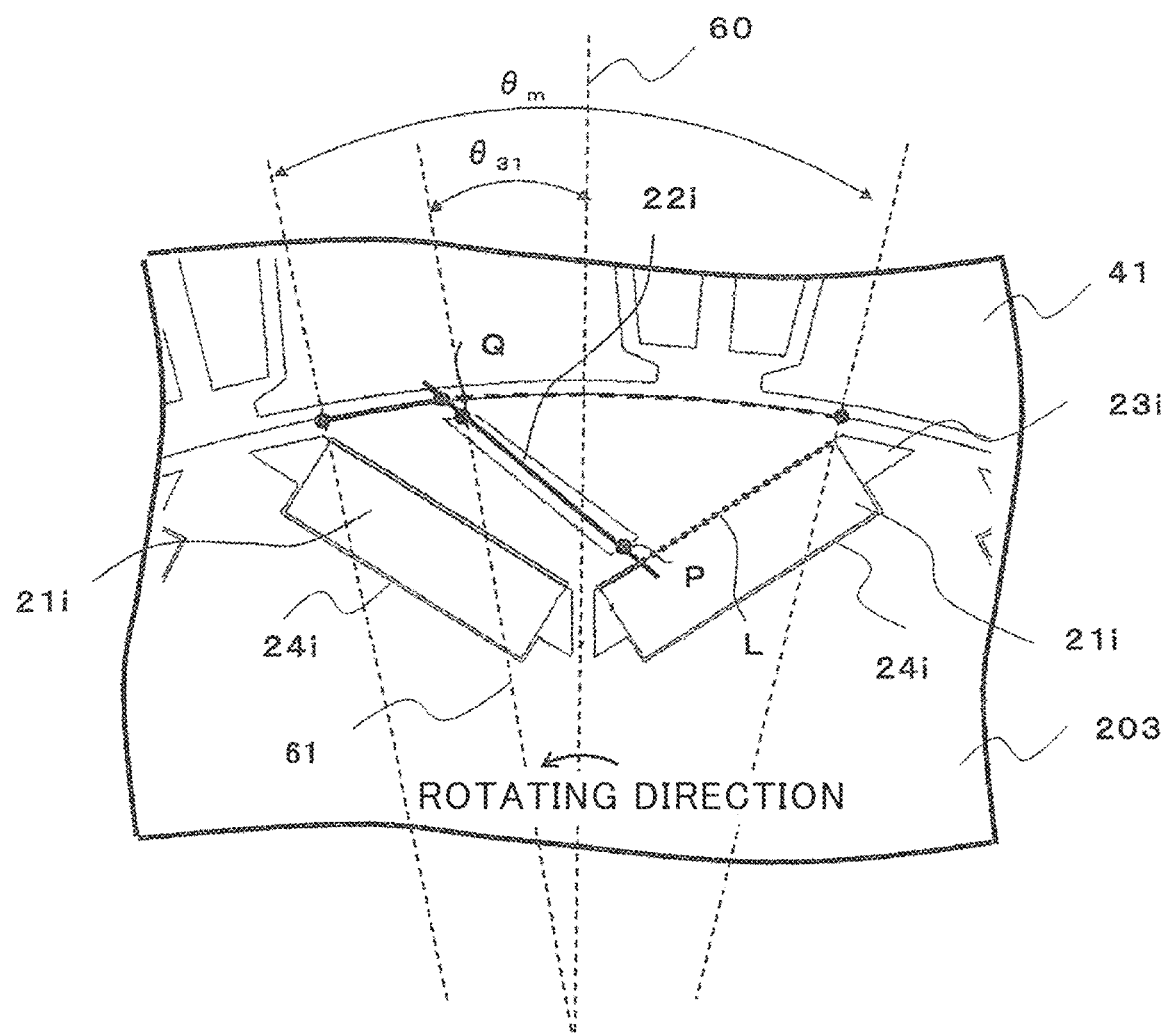
FIG. 22 is a partial sectional view of a first rotor unit of the rotating electric machine according to the seventh embodiment of the present invention.

FIG. 22 is a view for illustrating a sectional shape of the first rotor unit 203 of the rotor 42 according to the seventh embodiment of the present invention. FIG. 22 is an illustration of one magnetic pole portion of twelve magnetic poles of the rotor 42. FIG. 22 is an illustration of a cross section taken along a plane perpendicular to an axial direction of the first rotor unit 203.

Figure 23:
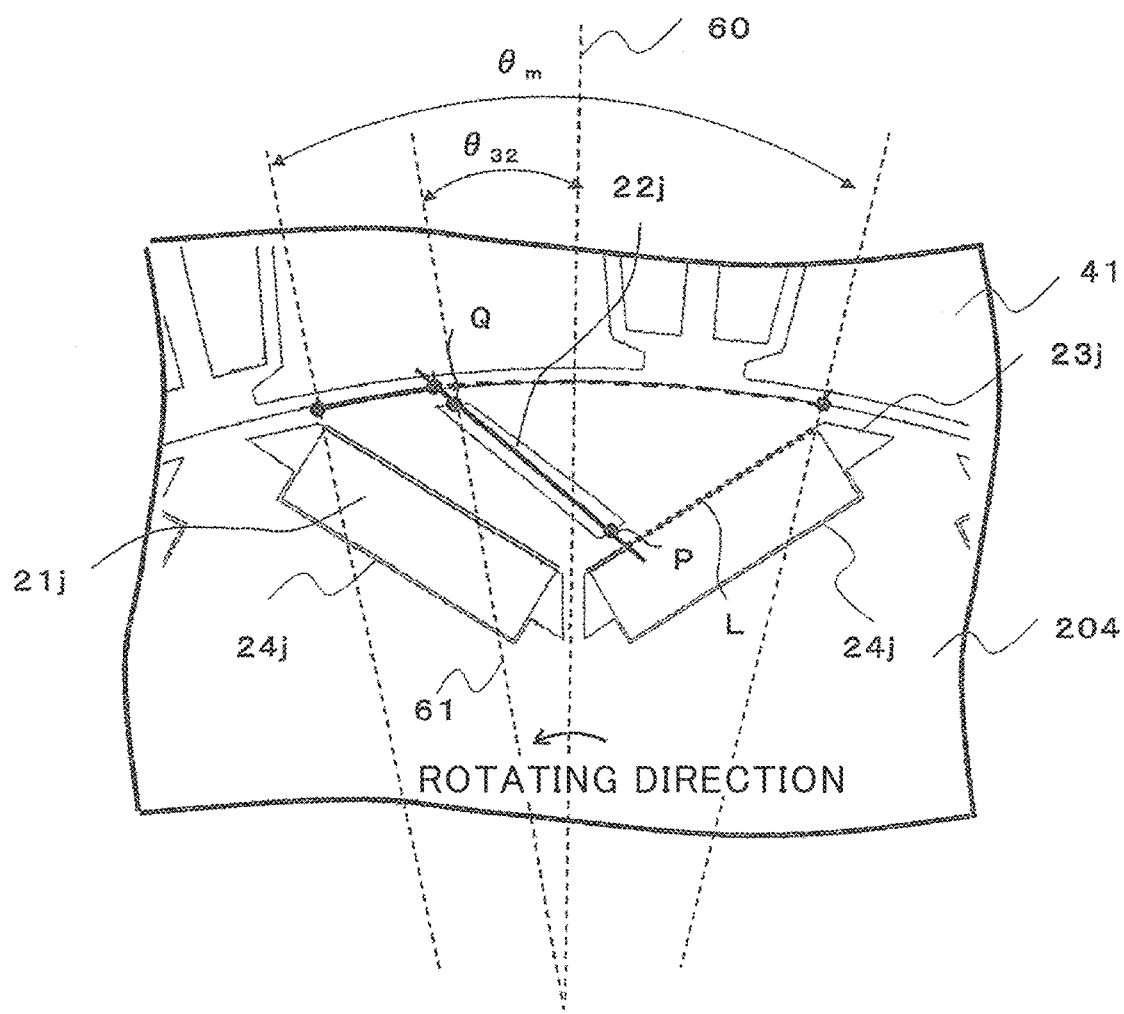
FIG. 23 is a partial sectional view of a second rotor unit of the rotating electric machine according to the seventh embodiment of the present invention.

FIG. 23 is a view for illustrating a sectional shape of the second rotor unit 204 of the rotor 42 according to the seventh embodiment of the present invention. FIG. 23 is an illustration of one magnetic pole portion of twelve magnetic poles of the rotor 42. FIG. 23 is an illustration of a cross section taken along a plane perpendicular to an axial direction of the second rotor unit 204.

As illustrated in FIG. 22, the first rotor unit 203 includes a pair of permanent magnets 21i, a slit 22i formed between the pair of permanent magnets 21i, and a pair of flux barriers 23i. The pair of permanent magnets 21i are inserted into magnet insertion holes 24i and fixed therein. The pair of permanent magnets 21i are arranged in a V-like pattern so as to be line-symmetric with respect to the d axis 60.

In the seventh embodiment, the slit 22i has a band-like shape. In this case, in FIG. 22, a point on a side of one of the pair of permanent magnets 21i, which is arranged on the returning side in the rotating direction, is defined as a point P. An air gap is formed between the point P and the corresponding permanent magnet 21i. The point P is arranged along one of two sides of the corresponding permanent magnet 21i in a longitudinal direction thereof, which is closer to the outer periphery side. Further, a point on the outer periphery side of the rotor 2, which is shifted from the point P to the advancing side in the rotating direction, is defined as a point Q. The slit 22i is formed along a straight line that connects the point P and the point Q. Specifically, a length of the slit 22i in a longitudinal direction thereof is the same as a linear distance between the point P and the point Q. In this case, an angle formed between a straight line 61 that connects the point Q and the rotation axis center O and the d axis 60 is referred to as "deflection angle of the slit 22i having the band-like shape", and is defined as a deflection angle θ31. It is preferred that the point P be located on the returning side in the rotating direction with respect to the d axis 60 and that the point Q be located on the advancing side in the rotating direction with respect to the d axis 60. Further, as illustrated in FIG. 22, when a distance from an intersection between one side of the permanent magnet 21i located closer to the point P and the straight line that connects the point Q and the point P to an end portion of the permanent magnet 21i is defined as a distance L, the distance L is appropriately set to a suitable value.

As described above, in the first rotor unit 203, the outer-periphery-side end portion of the slit 22i is located so as to be inclined in the rotating direction with respect to the d axis 60. In this manner, the phase of the magnet magnetic flux can be shifted to the advancing side in the rotating direction, and the phase of the reluctance magnetic flux can be shifted to the returning side in the rotating direction. As a result, at the time of power running, the current advance angle at which the magnet torque has a peak and the current advance angle at which the reluctance torque has a peak can be set closer to each other. Consequently, the torque can be increased.

Further, as illustrated in FIG. 23, the second rotor unit 204 includes a pair of permanent magnets 21j, a slit 22j formed between the pair of permanent magnets 21j, and a pair of flux barriers 23j. The pair of permanent magnets 21j are inserted into magnet insertion holes 24j and fixed therein. The pair of permanent magnets 21j are arranged in a V-like pattern so as to be line-symmetric with respect to the d axis 60.

In the seventh embodiment, the slit 22j has a band-like shape. In this case, in FIG. 23, a point on a side of one of the pair of permanent magnets 21j, which is arranged on the returning side in the rotating direction, is defined as a point P. An air gap is formed between the point P and the corresponding permanent magnet 21j. The point P is arranged along one of two sides of the corresponding permanent magnet 21i in a longitudinal direction thereof, which is closer to the outer periphery side. Further, a point on the outer periphery side of the rotor 2, which is arranged on the advancing side in the rotating direction with respect to the point P, is defined as a point Q. The slit 22j is formed along a straight line that connects the point P and the point Q. Specifically, a length of the slit 22j in a longitudinal direction thereof is the same as a distance between the point P and the point Q. In this case, an angle formed between a straight line 61 that connects the point Q and the rotation axis center O and the d axis 60 is referred to as "deflection angle of the slit 22j having the band-like shape", and is defined as a deflection angle θ32. It is preferred that the point P be located on the returning side in the rotating direction with respect to the d axis 60 and that the point Q be located on the advancing side in the rotating direction with respect to the d axis 60. Further, as illustrated in FIG. 22, when a distance from an intersection between one side of the permanent magnet 21i located closer to the point P and the straight line that connects the point Q and the point P to an end portion of the permanent magnet 21i is defined as a distance L, the distance L is appropriately set to a suitable value. In this case, the deflection angle θ31 of FIG. 22 and the deflection angle θ32 of FIG. 23 are set as θ31≠θ32.

As described above, in the second rotor unit 204, the outer-periphery-side end portion of the slit 22j is located so as to be inclined in the rotating direction with respect to the d axis 60. In this manner, the phase of the magnet magnetic flux can be shifted to the advancing side in the rotating direction, and the phase of the reluctance magnetic flux can be shifted to the returning side in the rotating direction. As a result, at the time of power running, the current advance angle at which the magnet torque has a peak and the current advance angle at which the reluctance torque has a peak can be set closer to each other. Consequently, the torque can be increased.

Further, as described above, in the seventh embodiment, the deflection angle θ31 of FIG. 22 and the deflection angle θ32 of FIG. 23 are set as θ31≠θ32. In this manner, when the deflection angle θ31 of the slit 22i of the first rotor unit 203 and the deflection angle θ32 of the slit 22j of the second rotor unit 204 are set to different angles, the magnetic paths for the magnet magnetic flux are changed so as to be different, to thereby change an amplitude and a phase of a permeance harmonic wave of the rotor 42. Thus, a phase of a torque ripple that occurs in the first rotor unit 203 and a phase of a torque ripple that occurs in the second rotor unit 204 can be set so as to be different from each other. As a result, the torque ripples can be canceled out in the rotor 42 as a whole.

As described above, in the seventh embodiment, the outer-periphery-side end portion of each of the slits 22i and 22j is inclined in the rotating direction. As a result, the phase of the magnet magnetic flux can be shifted to the advancing side in the rotating direction, and the phase of the reluctance magnetic flux can be shifted to the returning side in the rotating direction. Thus, at the time of power running, the current advance angle at which the magnet torque has a peak and the current advance angle at which the reluctance torque has a peak can be set closer to each other. Thus, the output torque can be increased.

Further, the deflection angle θ31 of the slit 22*i* of the first rotor unit 203 and the deflection angle θ32 of the slit 22*j* of the second rotor unit 204 are set to different angles. Thus, the magnetic paths for the magnet magnetic flux are changed so as to be different, to thereby change the amplitude and the phase of the permeance harmonic wave of the rotor 42. Thus, the phase of the torque ripple that occurs in the first rotor unit 203 and the phase of the torque ripple that occurs in the second rotor unit 204 can be set so as to be different from each other. Thus, the torque ripples can be canceled out as in the rotor 42 as a whole. As a result, the torque ripple can be reduced.

In the seventh embodiment, the number of rows of each of the slits 22*i* and 22*j* is set to one. However, the number of rows is not limited thereto. The number of rows of each of the slits 22*i* and 22*j* may be set to a suitable value equal to or larger than two. Further, the number of stages of the rotor units has been described as two. However, the number of stages of the rotor units may be set to a suitable number. In this case, the rotor 42 is configured so that at least one of the deflection angles of the slits 22*i* and 22*j*, each having the band-like shape, and the number of rows of the slits 22*i* and 22*j* are different between the rotor units adjacent to each other in the axial direction.

Eighth Embodiment

Figure 24:
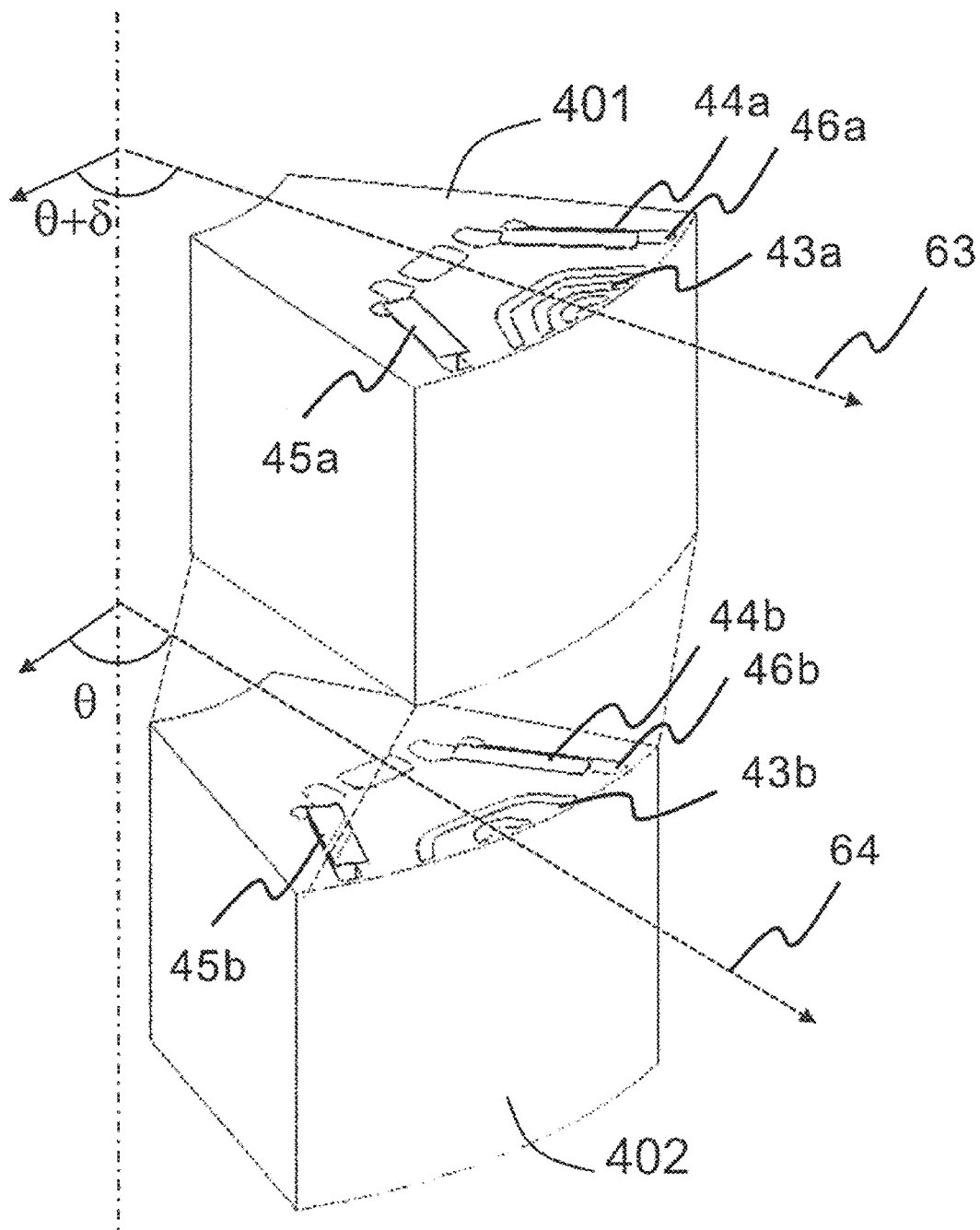
FIG. 24 is an exploded perspective view for illustrating a configuration of a rotor of a rotating electric machine according to an eighth embodiment of the present invention for one pole.

FIG. 24 is an exploded perspective view for illustrating a rotor for one pole and for illustrating a configuration of a rotating electric machine according to an eighth embodiment of the present invention. The rotor includes a first rotor unit 401 and a second rotor unit 402. The first rotor unit 401 has magnetic slits 43*a* arranged in three rows, and the second rotor unit 402 has magnetic slits 43*b* arranged in two rows. The first rotor unit 401 and the second rotor unit 402 have sectional shapes different from each other. The magnetic slits 43*a* of the first rotor unit 401 have a symmetry axis 63 for each pole. Further, the magnetic slits 43*b* of the second rotor unit 402 have a symmetry axis 64 for each pole.

In the first rotor unit 401, as illustrated in FIG. 24, a pair of magnets 44*a*, a pair of magnet insertion holes 45*a*, flux barriers 46*a*, and the magnetic slits 43*a* are arranged so as to be line-symmetric with respect to the symmetry axis 63.

Similarly, in the second rotor unit 402, as illustrated in FIG. 24, a pair of magnets 44*b*, a pair of magnet insertion holes 45*b*, flux barriers 46*b*, and the magnetic slits 43*b* are arranged so as to be line-symmetric with respect to the symmetry axis 64.

In the eighth embodiment, the first rotor unit 401 is arranged to be shifted from the second rotor unit 402 so that the symmetry axis 63 of the first rotor unit 401 is rotated counterclockwise with respect to the symmetry axis 64 of the second rotor unit 402 by an angle δ [deg] about the rotation axis of the rotor.

As described above, the first rotor unit 401 and the second rotor unit 402 are shifted from each other through the rotation. As a result, the rotor units are allowed to skew. Thus, spatial phases of the electromotive forces themselves of the magnets can be shifted from each other between the first rotor unit 401 and the second rotor unit 402. As a result, a phase of a torque ripple that occurs in the first rotor unit 401 and a phase of a torque ripple that occurs in the second rotor unit 402 can be shifted from each other. Thus, the torque ripple can be reduced in the rotor as a whole.

The eighth embodiment is not limited to the configuration of FIG. 24.

Figure 25:
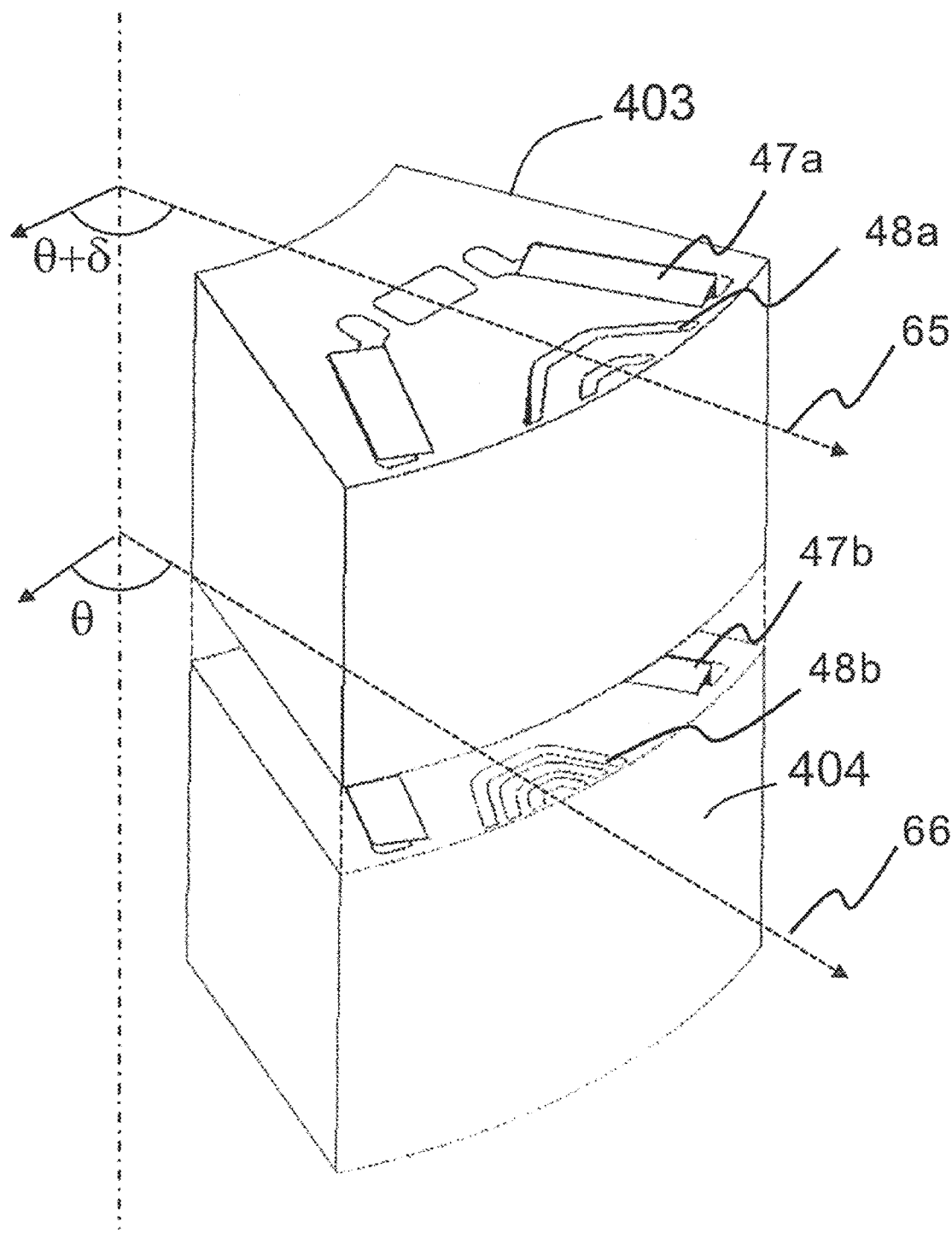
FIG. 25 is an exploded perspective view for illustrating a configuration of a rotor of the rotating electric machine according to the eighth embodiment of the present invention for one pole.

For example, a configuration illustrated in FIG. 25 may be used. Specifically, as illustrated in FIG. 25, when viewed in the height direction of the rotation axis, positions of magnets 47*a* of a first rotor unit 403 and positions of magnets 47*b* of a second rotor unit 404 may be the same. In this case, a symmetry axis of magnetic slits 48*a* of the first rotor unit 403 is referred to as "symmetry axis 65", and a symmetry axis of magnetic slits 48*b* of the second rotor unit 404 is referred to as "symmetry axis 66". In this case, the symmetry axis 65 is located at a position that is rotated counterclockwise with respect to the symmetry axis 66 by the angle δ [deg] about the rotation axis of the rotor. Specifically, in FIG. 25, when viewed in the height direction of the rotation axis, the symmetry axis 65 is located not at the same position as that of the symmetry axis 66, but at a position shifted from the symmetry axis 66.

As described above, as in the example illustrated in FIG. 25, the positions of the magnets 47*a* of the first rotor unit 403 and the positions of the magnets 47*b* of the second rotor unit 404 are set to be the same. With the configuration described above, at the time of manufacture, the magnets 47*a* and 47*b* can be inserted through the first rotor unit 403 and the second rotor unit 404 in the height direction of the rotation axis. Further, leakage magnetic flux that is generated between the first rotor unit 403 and the second rotor unit 404 due to the magnets 47*a* and 47*b* can be reduced. Still further, when the symmetry axis 65 of the magnetic slits 48*a* of the first rotor unit 403 and the symmetry axis 66 of the magnetic slits 48*b* of the second rotor unit 404 are shifted from each other by the angle δ [deg], a non-magnetic region can be unevenly distributed with respect to a center of the pole. As a result, the magnet magnetic flux can be shifted to the advancing side and to the returning side in the rotating direction. Hence, a phase of the magnet magnetic flux of the first rotor unit 403 and a phase of the magnet magnetic flux of the second rotor unit 404 can be shifted from each other. As a result, the torque ripple caused by the magnet magnetic flux can be reduced.

In the eighth embodiment, with reference to FIG. 24 and FIG. 25, description has been given of the case in which two rotor units are provided as examples. However, the number of rotor units may be three or more. In this case, a plurality of stages of rotor units are only required to be arranged so that a symmetry axis of magnetic slits of at least one of the rotor units is shifted by the preset angle δ [deg] in the rotating direction about the rotation axis as an axial center with respect to a symmetry axis of magnetic slits of other rotor units.

The angle δ [deg] is not particularly limited, and is required to be appropriately set to a suitable angle.

In the first to eighth embodiments, description has been given of the case in which each of the slits 22 is hollow. However, the configurations of the slits 22 are not limited thereto. The slits 22 may be filled with, for example, a resin or a heat dissipating material, which has a lower permeability than a permeability of a material itself for forming the first rotor unit 201 and the second rotor unit 202.

REFERENCE SIGNS LIST

1 stator, 2 rotor, 4 spindle, 5 bearing, 9A first housing, 9B second housing, 10 stator core, 12 stator coil, 21*a*, 21*b*, 21*c*, 21*d*, 21*e*, 21*f*, 21*g*, 21*h*, 21*i*, 21*j* permanent magnet, 22, 22*a*, 22b, 22c, 22d, 22e, 22f, 22g, 22h, 22i, 22j slit, 23a, 23b, 23c, 23d, 23e, 23f, 23g, 23h, 23i, 23j flux barrier, 41 stator, 42 rotor, 60 d axis, 100, 100A rotating electric machine, 101 core back portion, 102 slot, 103 teeth, 201, 203 first rotor unit, 202, 204 second rotor unit, 250 spindle insertion hole

The invention claimed is:

1. A rotating electric machine comprising:
a stator having an annular shape; and
a rotor provided inside the stator,
wherein the rotor includes a plurality of stages of rotor units stacked in an axial direction of the rotor,
wherein each of the plurality of stages of rotor units includes a pair of permanent magnets and a slit arranged in one or more rows in a radial direction of the rotor between the pair of permanent magnets,
wherein shapes of the pair of permanent magnets arranged in each of the plurality of stages of the rotor units are the same for the plurality of stages of the rotor units,
wherein the slit has an arc-like shape that projects and is curved inward in a radial direction of the rotor and extends in a circumferential direction of the rotor, the slit having an opening opposed to an inner peripheral surface of the stator, and
wherein, when an angle formed between two straight lines that connect positions of both ends of the arc-like shape and a rotation axis center of the rotor is defined as an arc angle of the slit, the arc angle of the arc-like shape slit is different between at least two of the rotor units so as to set magnetic paths for reluctance magnetic flux different between at least two of the rotor units.

2. The rotating electric machine according to claim 1, wherein positions of the pair of permanent magnets arranged in each of the plurality of stages of the rotor units are the same for all the plurality of stages of the rotor units.

3. The rotating electric machine according to claim 1, wherein shapes and positions of magnet insertion holes into which the pair of permanent magnets arranged in each of the plurality of stages of the rotor units are to be inserted are the same for all the plurality of stages of the rotor units.

4. The rotating electric machine according to claim 1, wherein positions of end portions of the slit arranged in each of the plurality of stages of the rotor units are different between the rotor units.

5. The rotating electric machine according to claim 1, wherein the slit is each formed so as to pass through a center line of a magnetic pole formed by the pair of permanent magnets.

6. The rotating electric machine according to claim 1, wherein a width of the slit at least at both ends is different between at least two of the rotor units.

7. The rotating electric machine according to claim 1, wherein each of the plurality of stages of rotor units further includes:
a pair of permanent magnet insertion holes into which the plurality of permanent magnets are to be inserted; and
a pair of flux barriers formed in connection with the pair of permanent magnet insertion holes,
wherein, when an angle formed between two straight lines that connect outer-periphery-side end portions of the pair of flux barriers and the rotation axis center is defined as an angle formed between the pair of flux barriers, the angle formed between the pair of flux barriers is different between at least two of the rotor units.

8. The rotating electric machine according to claim 1, wherein a symmetry axis of the magnetic slit of at least one of the plurality of stages of the rotor units is located at a position shifted from a symmetry axis of the slit of the other rotor unit in a rotating direction of the rotor about a rotation axis of the rotor as an axial center.

9. The rotating electric machine according to claim 1, wherein shapes and positions of a pair of magnet insertion holes are the same for the plurality of stages of the rotor units.

10. The rotating electric machine according to claim 1, wherein the number of stages of the rotor units is three or more.

11. The rotating electric machine according to claim 1,
wherein the plurality of stages of the rotor units include two kinds of rotor units corresponding to a first rotor unit and a second rotor unit, and
wherein the first rotor unit and the second rotor unit are alternately stacked.

12. A rotating electric machine comprising:
a stator having an annular shape; and
a rotor provided inside the stator,
wherein the rotor includes a plurality of stages of rotor units stacked in an axial direction of the rotor,
wherein each of the plurality of stages of rotor units includes a pair of permanent magnets and a slit arranged in one or more rows in a radial direction of the rotor between the pair of permanent magnets,
wherein shapes of the pair of permanent magnets arranged in each of the plurality of stages of the rotor units are the same for the plurality of stages of the rotor units,
wherein the slit has an arc-like shape that projects and is curved inward in a radial direction of the rotor and extends in a circumferential direction of the rotor, the slit having an opening opposed to an inner peripheral surface of the stator,
wherein, when an angle formed between two straight lines that connect positions of both ends of the arc-like shape and a rotation axis center of the rotor is defined as an arc angle of the slit, at least one of the arc angle of the slit and the number of rows of the slits is different between at least two of the rotor units so as to set magnetic paths for reluctance magnetic flus different between at least two of the rotor units,
wherein, when the arc angle of the slit is divided into two arc angles by a center line of a magnetic pole formed by the pair of permanent magnets, and one of the two arc angles is defined as an arc angle on an advancing side in the rotating direction and the other arc angle is defined as an arc angle on a returning side in the rotating direction, the arc angle on the advancing side in the rotating direction and the arc angle on the returning side in the rotating direction are different from each other,
wherein the arc angle on the advancing side in the rotating direction is different between at least two of the rotor units, and
wherein the arc angle on the returning side in the rotating direction is different between at least two of the rotor units.

13. The rotating electric machine according to claim 1, wherein
a number of rows of the arc-like shape slits is different between at least two of the rotor units to set different magnetic paths for reluctance magnetic flux between the at least two of the rotor units, and
wherein the number of rows of the arc-like shape slits is a number of rows of the slits aligned in the radial direction.

* * * * *